US011119114B2

(12) United States Patent
Krueger et al.

(10) Patent No.: US 11,119,114 B2
(45) Date of Patent: Sep. 14, 2021

(54) ANCHOR STRUCTURE FOR SECURING OPTOMECHANICAL STRUCTURE

(71) Applicant: Honeywell International Inc., Morris Plains, NJ (US)

(72) Inventors: Neil Krueger, Saint Paul, MN (US); Matthew Puckett, Phoenix, AZ (US); Arthur Savchenko, Kirkland, WA (US); Chad Fertig, Bloomington, MN (US); Steven Tin, Plymouth, MN (US); Joshua Dorr, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 116 days.

(21) Appl. No.: 16/514,864

(22) Filed: Jul. 17, 2019

(65) Prior Publication Data

US 2021/0018530 A1    Jan. 21, 2021

(51) Int. Cl.
*G01P 15/093*    (2006.01)
*G01P 15/08*    (2006.01)
(Continued)

(52) U.S. Cl.
CPC ............. *G01P 15/093* (2013.01); *G01H 9/00* (2013.01); *G01P 15/0802* (2013.01); *G01P 15/097* (2013.01); *G01P 2015/0814* (2013.01)

(58) Field of Classification Search
CPC .. G01P 15/093; G01P 15/0802; G01P 15/097; G01P 15/032; G01P 15/03; G01P 21/00; G01H 9/00
See application file for complete search history.

(56) References Cited

U.S. PATENT DOCUMENTS 3,499,331 A    3/1970 Miller
4,233,847 A    11/1980 Walker
(Continued)

FOREIGN PATENT DOCUMENTS

CN    107219378 A    9/2017
CN    108519498 A    9/2018
(Continued)

OTHER PUBLICATIONS

Oudich et al., "Optomechanic interaction in a corrugated phoxonic nanobeam cavity," Physical Review B, Jun. 2014, 9 pp.
(Continued)

*Primary Examiner* — Helen C Kwok
(74) *Attorney, Agent, or Firm* — Shumaker & Sieffert, P.A.

(57) ABSTRACT

This disclosure is related to devices, systems, and techniques for securing one or more mechanical structures to a frame of a proof mass assembly. For example, a system includes a light-emitting device configured to emit an optical signal, a circuit including a modulating device configured to modulate the optical signal to produce a modulated optical signal, and a mechanical assembly. The mechanical assembly includes an anchor structure including a set of connecting structures configured to pass the modulated optical signal, where the set of connecting structures includes two or more connecting structures, and where a width of each connecting structure of the set of connecting structures is less than a maximum width of the anchor structure and a mechanical structure intersecting with the anchor structure, the mechanical structure configured to guide the modulated optical signal.

18 Claims, 10 Drawing Sheets

(51) Int. Cl.
   *G01H 9/00* (2006.01)
   *G01P 15/097* (2006.01)

(56) References Cited

U.S. PATENT DOCUMENTS

| | | | |
|---|---|---|---|
| 4,345,482 A | 8/1982 | Adolfsson et al. | |
| 4,422,331 A | 12/1983 | Walker | |
| 4,428,234 A | 1/1984 | Walker | |
| 4,628,175 A | 12/1986 | Nissl | |
| 4,733,561 A | 3/1988 | Gilby | |
| 4,739,660 A | 4/1988 | Fima | |
| 4,897,541 A | 1/1990 | Philips | |
| 4,900,918 A | 2/1990 | Killian | |
| 5,013,909 A | 5/1991 | Sondergeld et al. | |
| 5,095,763 A * | 3/1992 | Delatorre | G01L 1/106 |
| | | | 73/704 |
| 5,109,693 A | 5/1992 | Hojo et al. | |
| 5,291,014 A | 3/1994 | Brede et al. | |
| 5,496,436 A | 3/1996 | Bernstein et al. | |
| 5,501,103 A | 3/1996 | Woodruff et al. | |
| 5,559,358 A | 9/1996 | Burns et al. | |
| 5,689,107 A | 11/1997 | Hsu | |
| 5,770,473 A | 6/1998 | Hall et al. | |
| 5,786,927 A | 7/1998 | Greywall | |
| 6,018,390 A | 1/2000 | Youmans et al. | |
| 6,182,509 B1 | 2/2001 | Leung | |
| 6,350,983 B1 | 2/2002 | Kaldor et al. | |
| 6,481,283 B1 | 11/2002 | Cardarelli | |
| 6,494,095 B1 * | 12/2002 | Wan | G01P 15/0891 |
| | | | 73/514.26 |
| 6,510,737 B1 | 1/2003 | Hobbs et al. | |
| 6,546,798 B1 | 4/2003 | Waters et al. | |
| 6,594,061 B2 | 7/2003 | Huang et al. | |
| 6,745,627 B1 | 6/2004 | Woodruff et al. | |
| 6,763,723 B1 | 7/2004 | Zook et al. | |
| 6,789,053 B2 | 9/2004 | Collins | |
| 6,807,325 B1 | 10/2004 | Kraemmer et al. | |
| 6,911,765 B2 | 6/2005 | Kawashima | |
| 6,947,642 B2 | 9/2005 | Yamazaki | |
| 6,955,085 B2 | 10/2005 | Jones et al. | |
| 7,243,542 B2 | 7/2007 | Hulsing, II | |
| 7,427,522 B2 | 9/2008 | Morikawa et al. | |
| 7,573,924 B2 | 8/2009 | Tsuda et al. | |
| 7,612,887 B2 | 11/2009 | Choi et al. | |
| 7,613,367 B2 | 11/2009 | Levy et al. | |
| 7,743,661 B2 | 6/2010 | Berthold et al. | |
| 7,808,618 B1 | 10/2010 | Tawney et al. | |
| 7,822,090 B2 | 10/2010 | Minamio et al. | |
| 7,881,565 B2 | 2/2011 | Kilic et al. | |
| 7,920,270 B2 | 4/2011 | Chow et al. | |
| 7,980,115 B2 | 7/2011 | Stewart et al. | |
| 8,159,736 B2 | 4/2012 | Maleki et al. | |
| 8,288,926 B2 | 10/2012 | Furuhata et al. | |
| 8,334,984 B2 | 12/2012 | Perez et al. | |
| 8,537,368 B2 | 9/2013 | Kilic et al. | |
| 8,677,821 B2 | 3/2014 | Ayazi et al. | |
| 8,726,732 B2 | 5/2014 | Littler et al. | |
| 8,875,578 B2 | 11/2014 | Smith | |
| 8,887,567 B2 * | 11/2014 | Dwyer | G01P 15/097 |
| | | | 73/504.16 |
| 8,904,867 B2 | 12/2014 | Martin et al. | |
| 8,960,002 B2 | 2/2015 | Nasiri et al. | |
| 9,069,004 B2 | 6/2015 | Bhave et al. | |
| 9,194,782 B2 | 11/2015 | Jeon et al. | |
| 9,207,081 B2 | 12/2015 | Geen | |
| 9,228,916 B2 | 1/2016 | Valdevit et al. | |
| 9,239,340 B2 | 1/2016 | Hutchinson et al. | |
| 9,261,525 B2 | 2/2016 | Thiruvenkatanathan et al. | |
| 9,335,271 B2 | 5/2016 | Pruessner et al. | |
| 9,417,260 B2 | 8/2016 | Bulatowicz | |
| 9,455,354 B2 | 9/2016 | Acar | |
| 9,618,531 B2 | 4/2017 | Painter et al. | |
| 9,753,055 B2 | 9/2017 | Paquet et al. | |
| 9,766,099 B2 | 9/2017 | Pechstedt | |
| 9,874,581 B2 * | 1/2018 | Tin | G01P 21/00 |
| 9,927,458 B2 | 3/2018 | Bramhavar et al. | |
| 9,983,225 B2 | 5/2018 | Fertig et al. | |
| 10,031,158 B1 | 7/2018 | Douglas et al. | |
| 10,079,467 B2 | 9/2018 | Guzman et al. | |
| 10,107,936 B2 | 11/2018 | Compton | |
| 10,126,321 B2 | 11/2018 | Zandi et al. | |
| 10,139,564 B1 | 11/2018 | Homeijer et al. | |
| 2001/0047688 A1 * | 12/2001 | Woodruff | G01P 15/0802 |
| | | | 73/514.29 |
| 2004/0129867 A1 | 7/2004 | Mackey | |
| 2012/0103099 A1 | 5/2012 | Stuke et al. | |
| 2013/0204573 A1 | 8/2013 | Kandler | |
| 2013/0298675 A1 * | 11/2013 | Thiruvenkatanathan | |
| | | | G01C 19/5755 |
| | | | 73/504.16 |
| 2014/0043614 A1 | 2/2014 | Dhayalan et al. | |
| 2015/0020590 A1 | 1/2015 | Painter et al. | |
| 2016/0139170 A1 * | 5/2016 | Dwyer | G01P 21/00 |
| | | | 73/514.29 |
| 2016/0223329 A1 * | 8/2016 | Zandi | G01P 15/093 |
| 2016/0349283 A1 * | 12/2016 | Bramhavar | G01P 15/093 |
| 2016/0377647 A1 * | 12/2016 | Fertig | G01P 15/097 |
| | | | 73/1.38 |
| 2017/0057809 A1 | 3/2017 | Saint-patrice et al. | |
| 2017/0089944 A1 | 3/2017 | Duraffourg | |
| 2017/0242050 A1 | 8/2017 | Pan et al. | |
| 2018/0003749 A1 | 1/2018 | Dogiamis et al. | |
| 2018/0128850 A1 * | 5/2018 | Bramhavar | G01P 21/00 |
| 2018/0172723 A1 | 6/2018 | Bramhavar et al. | |
| 2018/0246139 A1 | 8/2018 | Zotov et al. | |
| 2018/0267078 A1 | 9/2018 | Sato | |
| 2019/0049485 A1 | 2/2019 | Stewart et al. | |

FOREIGN PATENT DOCUMENTS

| | | | |
|---|---|---|---|
| EP | 1310801 A1 | 5/2003 | |
| EP | 3112879 A1 | 4/2017 | |
| JP | H10327115 A | 12/1998 | |
| WO | 0071981 A1 | 11/2000 | |
| WO | 2008043737 A2 | 4/2008 | |
| WO | 2015/080662 A1 | 6/2015 | |
| WO | 2018197857 A1 | 11/2018 | |

OTHER PUBLICATIONS

Yen et al., "Corrugated aluminum nitride energy harvesters for high energy conversion effectiveness," Journal of Micromechanics and Microengineering, vol. 21, No. 8, Jul. 2011, 3 pp.

Kavitha et al., "Study of squeeze film damping characteristics under different gas mediums in a capacitive MEMS accelerometer," The Brazilian Society of Mechanical Sciences and Engineering, Feb. 20, 2015, 12 pp.

Chiu et al., "Development and Characterization of a CMOS-MEMS Accelerometer With Differential LC-Tank Oscillators," Journal of Microelectromechanical Systems, vol. 22, No. 6, Dec. 2013, pp. 1285-1295.

Zhang et al., "A Compact Low-Power Oscillation Circuit for the High Performance Silicon Oscillating Accelerometer," Conference Proceedings 1890, 040068, Oct. 5, 2017, 7 pp.

U.S. Appl. No. 16/371,762, filed Apr. 1, 2019, by Fertig et al.

U.S. Appl. No. 16/371,657, filed Apr. 1, 2019, by Fertig et al.

Beyazoglu, "Integrated MEMS Cavity Optomechanical Oscillators for Wireless and Optical Communications," Electrical Engineering and Computer Sciences University of California at Berkeley, Aug. 12, 2016, 130 pp.

Chen et al., "Optical Microfiber Technology for Current, Temperature, Acceleration, Acoustic, Humidity and Ultraviolet Light Sensing," Laser Physics and Photonic Devices Laboratories, School of Engineering, University of Austrailia, sensors, MDPI, Dec. 28, 2017, 25 pp.

Cohen et al., "High-Q microphotonic electro-optic modulator," Department of Electrical Engineering, University of Southern California, Pergamon, Solid-State Electronics, vol. 45, Mar. 29, 2001, 13 pp.

(56) References Cited

OTHER PUBLICATIONS

Gerberding et al., "Optomechanical reference accelerometer," Metrologia, vol. 52, No. 5, Apr. 2015, 13 pp.
Grutter, "Optical Whispering-Gallery Mode Resonators for Applications in Optical Communication and Frequency Control," Electrical Engineering and Computer Sciences University of California at Berkeley, Dec. 20, 2013, 127 pp.
Hutchison et al., "Z-Axis Optomechnical Accelerometer," IEEE 25th International Conference on Micro Electro Mechanical Systems (MEMS), Jan. 29 through Feb. 2, 2012, 5 pp.
Krause et al., "A high-resolution microchip optomechanical accelerometer," Nature Photonics, Oct. 14, 2012, 5 pp.
Krause et al., "Optical read out and feedback cooling of a nanostring optomechanical cavity," Laboratory of Applied Physics, California Institute of Technology, Jun. 3, 2015, 13 pp.
Lee et al., "Fabrication of a Micro-Opto-Mechanical Accelerometer Based on Intensity Modulation", Microsystems Technologies, vol. 10, Issue 2, Jan. 2004, 12 pp.
Li et al., "Characterization and Testing of a Micro-g Whispering Gallery Mode Optomechanical Accelerometer," Journal of Lightwave Technology, vol. 36, Issue 18, May 25, 2018, 8 pp.
Lu et al. "Optical Acceleration Measurement Method with Large Non-ambiguity Range and High Resolution via Synthetic Wavelength and Single Wavelength Superheterodyne Interferometry," MDPI, Sensors, vol. 18, Oct. 12, 2018, 11 pp.
Miao et al., "A microelectromechanically controlled cavity optomechanical sensing system," New Journal of Physics, Apr. 4, 2012, 17 pp.
Pruessner et al., "Integrated waveguide-BDR microcavity optomechanical system," Optical Society of America, Optics Express, vol. 19, No. 22, Oct. 24, 2011, 15 pp.
Schliesser et al., "High-sensitivity monitoring of micromechanical vibration using optical whispering gallery mode resonators," New Journal of Physics, vol. 10, Sep. 30, 2008, 25 pp.
Sheikhaleh et al., "An Optical MEMS Accelerometer Based on a Two-Dimensional Photonic Crystal Add-Drop Filter," IEEE, Journal of Lightwave Technology, vol. 35, No. 14, Jul. 15, 2017, 6 pp.
U.S. Appl. No. 16/391,074, filed Apr. 22, 2019, by Dorr et al.
U.S. Appl. No. 16/391,114, filed Apr. 1, 2019, by Dorr et al.
U.S. Appl. No. 16/514,905, filed Jul. 17, 2019, by Krueger et al.
U.S. Appl. No. 16/539,949, filed Aug. 13, 2019, by Krueger et al.
U.S. Appl. No. 16/539,974, filed Aug. 13, 2019, by Dorr et al.
U.S. Appl. No. 16/539,984, filed Aug. 13, 2019, by Krueger et al.
Williamson et al., "Dual-Carrier Floquet Circulator with Time-Modulated Optical Resonators," Microelectronics Research Center, American Chemical Society, ACS Photonics, vol. 5, Aug. 20, 2018, 9 pp.
Zhang et al., "Noise suppression of a micro-grating accelerometer based on the dual modulation method," OSA Publishing, Applied Optics, vol. 56, Issue 36, Apr. 2, 2019, 4 pp.
Eichenfield et al., "A picogram and nanometer scale photonic crystal opto-mechanical cavity," Cornell University, arXiv:0812.2953v1, Dec. 16, 2008, 15 pp.
Grutter et al., "Si3N4 Nanobeam Optomechanical Crystals," IEEE Journal of Selected Topics in Quantum Electronics, vol. 21, No. 4, Jul.-Aug. 2015, 11 pp.

\* cited by examiner

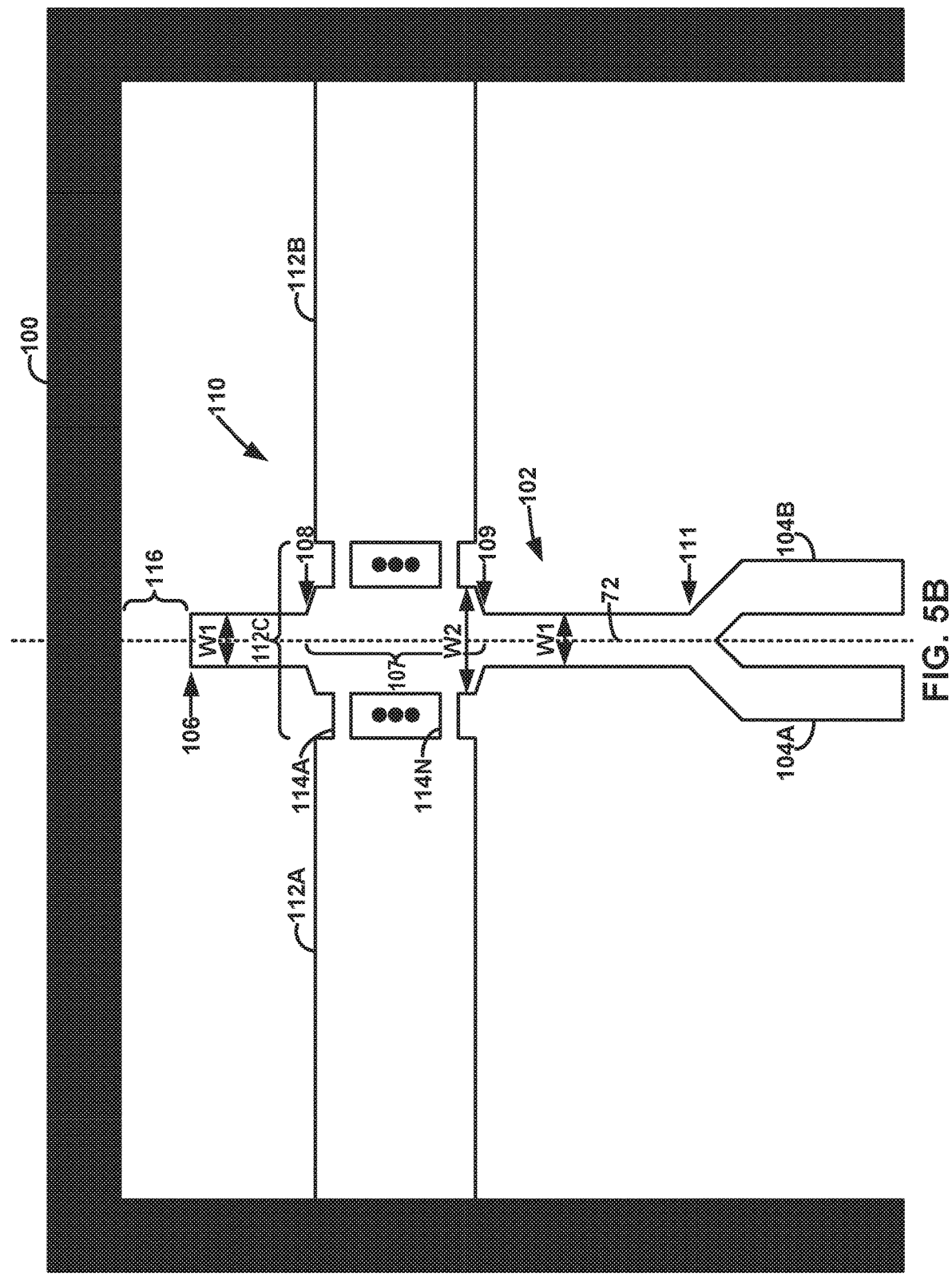

ANCHOR STRUCTURE FOR SECURING OPTOMECHANICAL STRUCTURE

STATEMENT REGARDING FEDERALLY SPONSORED RESEARCH OR DEVELOPMENT

This invention was made with Government support under N66001-16-C-4018 awarded by SPAWAR Systems Center Pacific. The Government has certain rights in the invention. This material is based upon work supported by the Defense Advanced Research Projects Agency (DARPA) and Space and Naval Warfare Systems Center Pacific (SSC Pacific).

TECHNICAL FIELD

This disclosure relates to optomechanical structures.

BACKGROUND

Inertial guidance systems use navigation grade accelerometers, such as Resonating Beam Accelerometers (RBAs). An RBA senses acceleration via stress-induced frequency shifts of vibrational modes of proof mass anchor beams. The beams may take the form of Double Ended Tuning Fork (DETF) structures.

SUMMARY

In general, the disclosure is directed to devices, systems, and techniques for efficiently guiding optical signals within an optomechanical support structure of a proof mass assembly. More specifically, in one example implementation, the disclosure describes techniques for inducing mechanical vibration in an optomechanical structure, where an anchor structure secures the optomechanical structure to a frame of the proof mass assembly. Additionally, a proximal end of the optomechanical structure may secure a proof mass within the frame. The anchor structure secures the optomechanical structure such that a mechanical quality factor of the optomechanical structure is relatively high. For example, the anchor structure may enable the mechanical vibration in the optomechanical structure to occur relatively unperturbed by forces that cause damping in the mechanical vibration. In some cases, the optomechanical structure guides a modulated optical signal. The modulated optical signal may cross a junction of the anchor structure and the optomechanical structure. A single-pass optical transmission efficiency associated with the junction may be relatively high. For example, the anchor structure may use multi-mode interference to enable the modulated optical signal to efficiently traverse the junction. As such, multi-mode interference may ensure that the single-pass optical transmission efficiency is high. In some examples, a circuit receives the modulated optical signal that passes through the DETF structure and determines an acceleration based on the modulated optical signal. An optomechanical structure may, in some cases, be referred to as "mechanical structure."

In some examples, a system comprising a light-emitting device configured to emit an optical signal, a circuit comprising a modulating device configured to modulate the optical signal to produce a modulated optical signal, and a mechanical assembly. The mechanical assembly includes an anchor structure comprising a set of connecting structures configured to pass the modulated optical signal, wherein the set of connecting structures comprises two or more connecting structures, and wherein a width of each connecting structure of the set of connecting structures is less than a maximum width of the anchor structure, and a mechanical structure intersecting with the anchor structure, the mechanical structure configured to guide the modulated optical signal.

In some examples, a mechanical assembly includes an anchor structure comprising a set of connecting structures configured to pass a modulated optical signal, wherein the set of connecting structures comprises two or more connecting structures, and wherein a width of each connecting structure of the set of connecting structures is less than a maximum width of the anchor structure, and a mechanical structure intersecting with the anchor structure, the mechanical structure configured to guide the modulated optical signal.

In some examples, a method includes emitting, using a light-emitting device, an optical signal, modulating, using a modulating device of a circuit, the optical signal to produce a modulated optical signal, passing, by a set of connecting structures of an anchor structure, the modulated optical signal, wherein the set of connecting structures comprises two or more connecting structures, and wherein a width of each connecting structure of the set of connecting structures is less than a maximum width of the anchor structure, and guiding, by a mechanical structure intersecting with the anchor structure, the modulated optical signal.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

FIG. 5B is a conceptual diagram of a distal portion of a DETF structure and another example anchor structure enclosed in a frame, in accordance with one or more techniques of this disclosure.

Like reference characters denote like elements throughout the description and figures.

DETAILED DESCRIPTION

Figure 1:
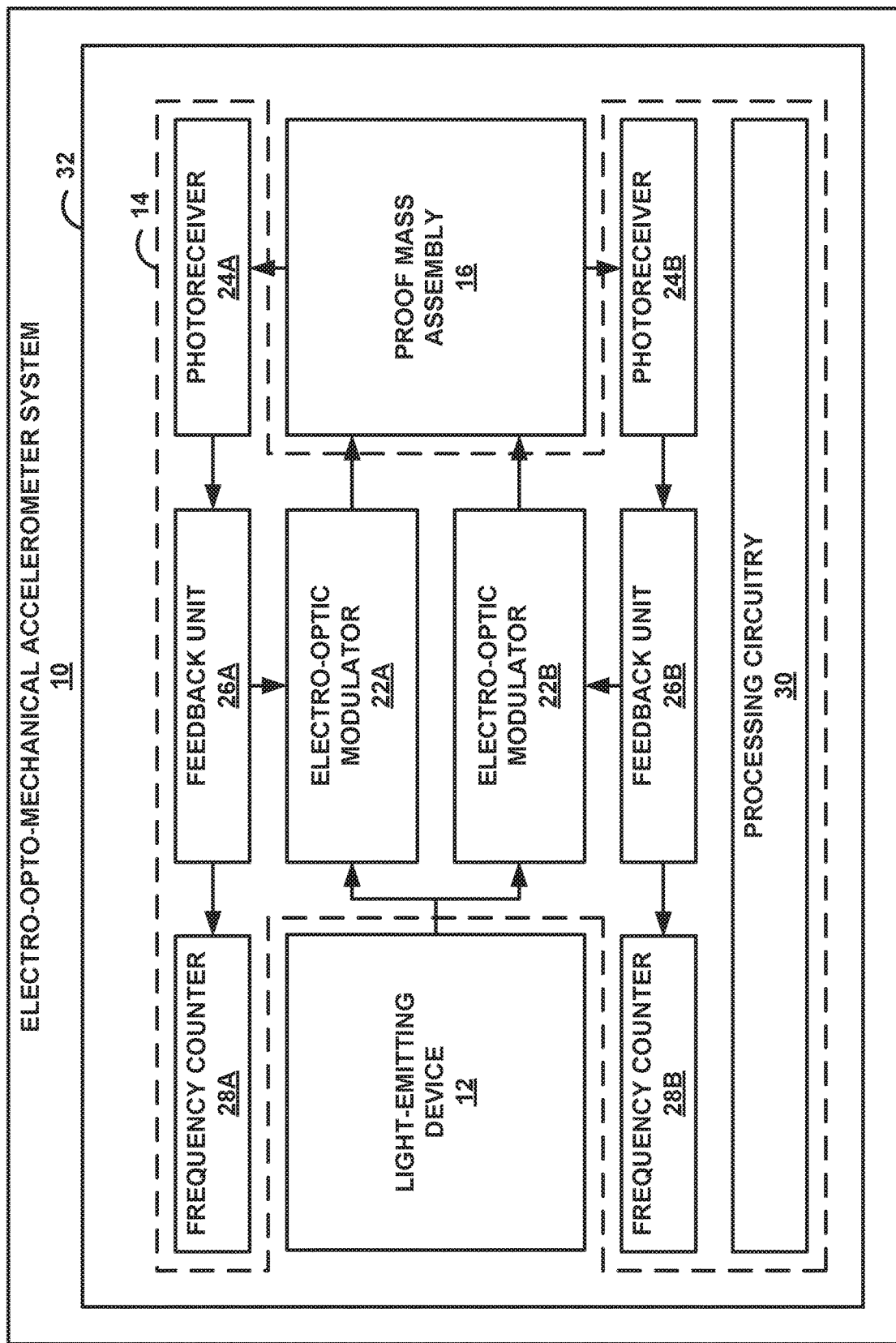
FIG. 1 is a block diagram illustrating an electro-optomechanical accelerometer system, in accordance with one or more techniques of this disclosure.

This disclosure is directed to devices, systems, and techniques for securing one or more double ended tuning fork (DETF) structures to a frame of a proof mass assembly. For example, an anchor structure may secure a distal portion of a DETF structure to the frame, enabling the DETF structure to suspend a proof mass within the frame. The proof mass assembly is a part of an accelerometer system configured to determine an acceleration of an object. Although techniques of this disclosure are described with respect to DETF structures, the techniques of this disclosure may be applied to secure any mechanical structure using an anchor structure. Additionally, the techniques of this disclosure are not meant to be limited to an accelerometer system. For example, mechanical structures such as DETF structures may be used in a variety of applications, including electrical filters (e.g., high pass filters, low pass filters, and band pass filters), strain sensors, pressure sensors, force sensors, and gyroscopes, where the DETF structures have a coupled optical degree of freedom.

The accelerometer system may be an electro-opto-mechanical accelerometer system configured to precisely measure very high acceleration values (e.g., up to 500,000 meters per second squared ($m/s^2$)) of the object. The electro-opto-mechanical accelerometer system uses a combination of electrical signals, optical signals, and mechanical signals to determine the acceleration of the object. In some cases, the accelerometer system is configured to measure the acceleration of the object in real-time or near real-time, such that processing circuitry may analyze the acceleration of the object over a period of time to determine a positional displacement of the object during the period of time. For example, the accelerometer system may be a part of an inertial navigation system (INS) for tracking a position of an object based, at least in part, on an acceleration of the object. Additionally, the accelerometer system may be located on or within the object such that the accelerometer system accelerates with the object. As such, when the object accelerates, the acceleration system (including the proof mass) accelerates with the object. Since acceleration over time is a derivative of velocity over time, and velocity over time is a derivative of position over time, processing circuitry may, in some cases, be configured to determine the position displacement of the object by performing a double integral of the acceleration of the object over the period of time. Determining a position of an object using the accelerometer system located on the object—and not using on a navigation system separate from the object (e.g., a Global Positioning System (GPS))—may be referred to as "dead reckoning."

In order to more accurately track the position of the object using the INS, it may be beneficial to improve a quality of acceleration values determined by the accelerometer system. For example, it may be beneficial to achieve high levels of sensitivity in the accelerometer system in order to improve the accuracy of the acceleration values. High sensitivity may enable the accelerometer system to detect very small acceleration values, detect a very small change in acceleration values, detect a large range of acceleration values, or any combination thereof. Additionally, it may be beneficial to accurately determine the acceleration of the object while the object is experiencing high levels of acceleration. In this way, the accelerometer system may enable an INS to accurately track the position of the object while a magnitude of the acceleration of the object is very high.

The accelerometer system may, in some examples, include a micro-electro-mechanical system (MEMS) accelerometer which includes a light-emitting device, a circuit, and a proof mass assembly which includes a proof mass suspended within a frame by DETF structures. The DETF structures may be configured to guide optical signals. Additionally, optical signals may induce mechanical vibration in the DETF structures. In some cases, acceleration causes a displacement of the proof mass relative to the frame, the displacement inducing stress in the DETF structures, which affects mechanical vibration frequencies (e.g., mechanical resonance frequencies) corresponding to the DETF structures. In this way, a mathematical relationship may exist between acceleration and the mechanical vibration frequencies of the DETF structures. As such, the mathematical relationship may be leveraged to determine acceleration. The accelerometer system uses, in some examples, a combination of optical signals and electrical signals to measure the mechanical vibration frequencies corresponding to the DETF structures and calculate acceleration based on the mechanical vibration frequencies.

For example, the circuit is configured to modulate, using an electro-optic modulator (EOM), an optical signal emitted by the light-emitting device. The modulated optical signal propagates through a DETF structure of the proof mass assembly, inducing mechanical vibration in the DETF structure. Additionally, the mechanical vibration further modulates the modulated optical signal such that the mechanical vibration frequency of the DETF structure is reflected in the modulated optical signal after the modulated optical signal passes through the DETF structure. The modulated optical signal arrives at a photoreceiver, which converts the modulated optical signal into an electrical signal. Additionally, the photoreceiver may preserve properties of the modulated optical signal when creating the electrical signal (e.g., preserve the mechanical vibrating frequency of the DETF structure). In this way, the circuit may process the electrical signal and analyze the processed electrical signal to determine the mechanical vibrating frequency of the DETF structure. Based on the mechanical vibrating frequency, processing circuitry may determine the acceleration of the object carrying the accelerometer system.

In some examples, the proof mass assembly further includes one or more tethers which contribute to the suspension of the proof mass. For example, the proof mass may be suspended in a first direction within the frame by the DETF structures. Additionally, the proof mass may be suspended in a second direction and a third direction by one or more tethers. In some cases, the one or more tethers prevent the proof mass from being displaced in the second direction and the third direction, but the DETF structures allow the proof mass to be displaced in the first direction. The first direction, the second direction, and the third direction may represent three axes (e.g., x-axis, y-axis, and z-axis) of a three-dimensional Cartesian space. In this way, the proof mass assembly, in some cases, may only allow the proof mass to displace along a single proof mass displacement axis, thus enabling the accelerometer system to measure the acceleration relative to the proof mass displacement axis. In some cases, to obtain an acceleration relative to all three Cartesian axes, three accelerometer systems are implemented such that the proof mass displacement axes of the respective accelerometer systems are aligned to form an x-axis, a y-axis, and a z-axis of a Cartesian space.

The accelerometer system may employ a positive feedback loop to simplify a manner in which the acceleration of the object is measured. For example, the circuit may direct the processed electric signal to the EOM, which modulates the optical signal emitted by the light-emitting device based on the processed electrical signal. In this way, the optical signal input to the proof mass assembly depends, at least in part, on the optical signal output from the proof mass assembly to the circuit. By using the positive feedback loop, the accelerometer system may improve an efficiency in which the circuit calculates the acceleration (e.g., decreases a number of steps required to calculate the acceleration). For example, to calculate the acceleration value, processing circuitry may subtract a baseline frequency value from the mechanical vibration frequency of the DETF structure to obtain a frequency difference value. The baseline frequency value may, in some cases, represent a mechanical vibration frequency of the DETF structure while the proof mass is not displaced along the proof mass displacement axis (i.e., acceleration is 0 m/s$^2$). In some examples, the frequency difference value is correlated with acceleration, enabling the processing circuitry to use the correlation to determine acceleration based on the frequency difference value. As such, the positive feedback loop may ensure that a small number of calculation steps is required to determine acceleration.

The DETF structures of the proof mass assembly are secured to the frame using respective anchor structures. For example, an anchor structure may be fixed to a distal portion of a DETF structure. The anchor structure and the DETF structure may be perpendicular such that the anchor structure and the DETF structure form a cross shape, where the distal portion of the DETF structure extends through a middle portion of the anchor structure and ends of the anchor structure are fixed to the frame of the proof mass assembly. In some cases, since the ends of anchor structure are fixed to the frame and the middle portion of the anchor structure is fixed to the DETF structure, the anchor structure obviates a need for the DETF structure itself to be fixed to the frame. In some cases, the middle portion of the anchor structure includes a set of connecting structures. The set of connecting structures includes two or more connecting structures. Each connecting structure of the set of connecting structures, in some examples, may be parallel to other connecting structures of the set of connecting structures. Additionally, each connecting structure of the set of connecting structures may be perpendicular to the DETF structure. The DETF structure is fixed to each connecting structure of the set of connecting structures such that the modulated optical signal which propagates through the DETF structure also propagates through each connecting structure of the set of connecting structures. In this way, it may be beneficial for the modulated optical signal to efficiently pass the set of connecting structures.

As discussed above, it may be desirable for the accelerometer system to achieve a high level of sensitivity in order to improve a quality of the acceleration values measured by the accelerometer system. In some cases, a set of parameters may impact the sensitivity of the accelerometer system. The set of parameters may, in some examples, include a mechanical quality factor associated with the DETF structure and a single-pass optical transmission efficiency associated with the first set of connecting structures. If the mechanical quality factor of the DETF structure increases, an amount of damping which occurs during the mechanical vibration of the DETF structure may decrease, thus increasing the sensitivity of the accelerometer system. Additionally, if the single-pass optical transmission efficiency associated with the middle portion of the anchor structure increases, a greater amount of the modulated optical signal which propagates through the DETF structure may be preserved, thus increasing the sensitivity of the accelerometer system. Consequently, it may be beneficial for the mechanical quality factor of the DETF structure and the single-pass optical transmission efficiency associated with the middle portion of the anchor structure to be maintained at relatively high values.

One or more aspects of the middle portion of the anchor structure may impact both of the mechanical quality factor of the DETF structure and the single-pass optical transmission efficiency. For example, if a thickness of the middle portion of the anchor structure is relatively large, the mechanical quality factor of the DETF structure may be relatively large (beneficial to high sensitivity) and the single-pass optical transmission efficiency associated with the middle portion may be relatively low (not beneficial to high sensitivity). Additionally, if the thickness of the middle portion of the anchor structure is relatively small, the mechanical quality factor of the DETF structure may be relatively small (not beneficial to high sensitivity) and the single-pass optical transmission efficiency associated with the middle portion may be relatively high (beneficial to high sensitivity). In some examples, the set of connecting structures may induce multi-mode interference as the modulated optical propagates through the junction of the DETF structure and the anchor structure, the multi-mode interference ensuring that the single-pass optical transmission efficiency remains at a relatively high value and the set of connecting structures ensuring that the mechanical quality factor of the DETF structure remains at a relatively high value. In this way, the set of connecting structures may cause a sensitivity of the accelerometer system to increase.

FIG. 1 is a block diagram illustrating an electro-optomechanical accelerometer system 10, in accordance with one or more techniques of this disclosure. As illustrated in FIG. 1, accelerometer system 10 includes light-emitting device 12, circuit 14, proof mass assembly 16, and housing 32. Additionally, in the example illustrated in FIG. 1, circuit 14 includes electro-optic-modulators (EOM) 22A, 22B (collectively, "EOMs 22"), photoreceivers 24A, 24B (collectively, "photoreceivers 24"), feedback units 26A, 26B (collectively, "feedback units 26"), frequency counters 28A, 28B (collectively, "frequency counters 28"), and processing circuitry 30. In the example of FIG. 1, light-emitting device 12, proof mass assembly 16, EOM 22A, photoreceiver 24A, feedback unit 26A, and frequency counter 28A form a first positive feedback loop. Additionally, in the example of FIG. 1, light-emitting device 12, proof mass assembly 16, EOM 22B, photoreceiver 24B, feedback unit 26B, and frequency counter 28B form a second positive feedback loop.

Accelerometer system 10 may, in some examples, be configured to determine an acceleration associated with an object (not illustrated in FIG. 1) based on a measured vibration frequency of a set of DETF structures which suspend a proof mass of proof mass assembly 16, where the vibration of the DETF structures is induced by an optical signal emitted by light-emitting device 12. In some examples, the first positive feedback loop generates a first frequency value representing a vibration frequency of a first DETF structure and the second positive feedback loop generates a second frequency value representing a vibration frequency of a second DETF structure. Based on the first vibration frequency and the second vibration frequency, accelerometer system 10 may determine a first acceleration value and a second acceleration value, respectively. In some examples, accelerometer system 10 determines an acceleration of an object based on the first acceleration value and the second acceleration value. In some examples, accelerometer system 10 determines the acceleration of the object based on the first acceleration value. In some examples, accelerometer system 10 determines the acceleration of the object based on the second acceleration value.

Additionally, in some cases, accelerometer system 10 may determine a difference between the first frequency value and the second frequency value and/or determine a difference between the first acceleration value and the second acceleration value. By determining the difference between the respective frequency and/or acceleration values identified using the first positive feedback loop and the second positive feedback loop, accelerometer system 10 may reject one or more common mode errors present in the respective frequency and/or acceleration values.

Light-emitting device 12 may, in some cases, include a laser device configured to emit photons. In some examples, light-emitting device 12 emits the photons at an optical power within a range between 0.1 microwatts (μW) and 10 μW. In some examples, light-emitting device 12 is a semiconductor laser which includes a laser diode.

In some examples, circuit 14 may include a set of electrical components for processing and analyzing electrical signals received by photoreceivers 24. Components of circuit 14 are described in further detail below.

EOMs 22 may represent optical devices configured to modulate, based on electrical signals produced and processed by circuit 14, an optical signal emitted by light-emitting device 12. EOM 22A, for example, may include a set of crystals (e.g., Lithium Niobate crystals), where a refractive index of the set of crystals changes as a function of an electric field proximate to the set of crystals. The refractive index of the crystals may determine a manner in which EOM 22A modulates the optical signal. For example, the crystals of EOM 22A may receive the optical signal from light-emitting device 12 while EOM 22A is also receiving an electrical signal from feedback unit 26A of circuit 14. As such, the electrical signal may affect the electric field proximate to the crystals of EOM 22A, thus causing EOM 22A to modulate the optical signal. In some examples, EOM 22A modulates the optical signal by modulating the refractive index of the crystals using the electrical signal. EOM 22A, in some cases, may transmit the modulated optical signal to proof mass assembly 16. In some examples, EOM 22B is substantially similar to EOM 22A, with EOM 22B controlled by an electrical signal from feedback unit 26B.

In general, photoreceivers 24 may each include one or more transistors configured to absorb photons of an optical signal and output, in response to absorbing the photons, an electrical signal. In this manner, photoreceivers 24 may be configured to convert optical signals into electrical signals. Photoreceiver 24A, for example, may include a p-n junction that converts the photons of the optical signal into the electrical signal, where the electrical signal preserves at least some parameters of the optical signal. One or more frequency values and intensity values associated with the optical signal may be reflected in the electrical signal produced by photoreceiver 24A in response to photoreceiver 24A receiving the optical signal. For example, photoreceiver 24A may produce a stronger electrical signal (i.e., greater current magnitude) in response to receiving a stronger (e.g., greater power) optical signal. Additionally, in some cases, photoreceiver 24A may produce the electrical signal to reflect the one or more frequency values corresponding to the received optical signal. In other words, processing circuitry (e.g., processing circuitry 30) may analyze the electrical signal to determine the one or more frequency values corresponding to the optical signal. Photoreceiver 24A may include semiconductor materials such as any combination of Indium Gallium Arsenide, Silicon, Silicon Carbide, Silicon Nitride, Gallium Nitride, Germanium, or Lead Sulphide. In some examples, photoreceiver 24B is substantially similar to photoreceiver 24A.

Feedback units 26 may each include a set of circuit components for processing electrical signals. In some examples, the set of circuit components included in feedback unit 26A may include any combination of a band pass filter, a phase shifter, an electronic amplifier, and a voltage limiter. Such components may process, or filter, the electrical signal such that certain aspects of the electrical signal may be more efficiently measured (e.g., frequency values or intensity values). In the example of FIG. 1, feedback unit 26A may receive an electrical signal from photoreceiver 24A and output a processed electrical signal to EOM 22A and frequency counter 28A. In this way, feedback unit 26A acts as a part of a first positive feedback loop by processing an electrical signal which EOM 22A uses to modulate an optical signal emitted by light-emitting device 12, where the modulated optical signal passes through proof mass assembly 16 before arriving back at circuit 14 for processing by feedback unit 26A. Feedback unit 26B may be substantially similar to feedback unit 26A in that feedback unit 26B receives an electrical signal from photoreceiver 24B, and delivers a processed electrical signal to frequency counter 28B and EOM 22B. As such, feedback unit 26B operates within a second feedback loop in a similar manner to which feedback unit 26A operates within the first feedback loop.

In some examples, frequency counters 28 are circuit components that are each configured for measuring a frequency of an electrical signal. For example, frequency counter 28A may determine one or more frequency values corresponding to the processed electrical signal produced by feedback unit 26A. Frequency counter 28A may measure frequency values corresponding to the processed electrical signal in real-time or near real-time, such that frequency counter 28A tracks the frequency values as a function of time. Frequency counter 28B may be substantially similar to frequency counter 28A, except frequency counter 28B receives an electrical signal from feedback unit 26B rather than from feedback unit 26A.

Processing circuitry 30, and circuit 14 generally, may include one or more processors that are configured to implement functionality and/or process instructions for execution within accelerometer system 10. For example, processing circuitry 30 may be capable of processing instructions stored in a storage device (not illustrated in FIG. 1). Processing circuitry 30 may include, for example, microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, processing circuitry 30 may include any suitable structure, whether in hardware, software, firmware, or any combination thereof, to perform the functions ascribed herein to processing circuitry 30.

Proof mass assembly 16 may include a proof mass, a frame, a set of tethers, and a set of DETF structures. The proof mass, in some examples, is suspended within the frame by the set of tethers and the set of DETF structures. For example, the set of DETF structures may suspend the proof mass in a first direction relative to the frame. Additionally, the set of tethers may suspend the proof mass in a second direction and a third direction relative to the frame. The first direction, the second direction, and the third direction may represent three axes (e.g., x-axis, y-axis, and z-axis) of a Cartesian space. In some cases, the set of DETF structures enable the proof mass to be displaced in the first direction. Additionally, in some cases, the set of tethers prevent the proof mass from being displaced in the second direction and the third direction. In this way, proof mass assembly 16 may only allow the proof mass to be displaced along a single axis (e.g., a displacement axis). Since the displacement of the proof mass may determine the acceleration measured by circuit 14, accelerometer system 10 may be configured to determine the acceleration relative to the displacement axis.

In some examples, the first positive feedback loop (e.g., device 12, proof mass assembly 16, EOM 22A, photoreceiver 24A, feedback unit 26A, and frequency counter 28A) and the second positive feedback loop (e.g., light-emitting device 12, proof mass assembly 16, EOM 22B, photoreceiver 24B, feedback unit 26B, and frequency counter 28B) are configured to independently determine an acceleration value representative of an acceleration of an object including accelerometer system 10. For example, light-emitting device 12 may emit an optical signal, EOM 22A may modulate the optical signal to obtain a first modulated optical signal, and EOM 22A may transmit the first modulated optical signal to proof mass assembly 16. Proof mass assembly 16, in some examples, includes a first DETF structure (not illustrated in FIG. 1) configured to guide the first modulated optical signal. The first DETF structure may act as an optical waveguide, where the first modulated optical signal propagates from a distal end of the first DETF structure to a proximal end of the first DETF structure, and subsequently propagates from the proximal end of the first DETF structure to the distal end of the first DETF structure before exiting proof mass assembly 16. As the first modulated optical signal propagates through the first DETF structure, the first modulated optical signal may both induce a mechanical vibration in the first DETF structure and retain one or more parameters (e.g., the mechanical vibration frequency) associated with the first DETF structure.

Proof mass assembly 16 may include a first anchor structure which secures the first DETF structure to the frame, enabling the first DETF structure to suspend the proof mass within the frame. The first anchor structure may be perpendicular (i.e., normal) to the first DETF structure. In some examples, the first anchor structure includes a first portion connected to the frame, a second portion connected to the frame, and a third portion between the first portion and the second portion. The third portion may include a first set of connecting structures (not illustrated in FIG. 1), each connecting structure of the first set of connecting structures connecting the first portion and the second portion. Each connecting structure of the first set of connecting structures may be perpendicular to the first DETF structure. Each connecting structure of the first set of connecting structures may be connected to the first DETF structure, enabling the first modulated optical signal to propagate through the first set of connecting structures via the first DETF structure. Additionally, in some examples, the first anchor structure may include a single portion including the first set of connecting structures, where both ends of each connecting structure of the first set of connecting structures are connected to the frame.

In some examples, the first anchor structure and the first DETF structure may form a cross shape (†), the ends of the first anchor structure (e.g., the ends of the "arms" of the cross shape) being connected to the frame, and the proximal end (e.g., the "bottom" of the cross shape) of the first DETF structure being connected to the proof mass. The distal end (e.g., the "top" of the cross shape) of the first DETF structure may be suspended such that a first space exists between the distal end of the first DETF structure and the frame. In some examples, the first modulated optical signal crosses the frame via an optical fiber and couples across the first space to the distal end of the first DETF structure. Subsequently, the first modulated optical signal propagates through a distal portion of the first DETF structure which is connected to the first set of connecting structures to a proximal end of the first DETF structure. The first modulated optical signal may propagate back through the length of the first DETF structure, passing across the first set of connecting structures a second time before coupling across the first space and crossing the frame via an optical fiber.

Photoreceiver 24A may receive the first modulated optical signal from proof mass assembly 16, where properties of the first modulated optical signal received by photoreceiver 24A may be affected by mechanical vibrations of the first DETF structure of proof mass assembly 16. Photoreceiver 24A converts the first modulated optical signal into a first electrical signal and transmits the first electrical signal to feedback unit 26A. In some examples, feedback unit 26A processes the first electrical signal to obtain a first processed electrical signal. For example, feedback unit 26A may use any combination of a first band pass filter, a first phase shifter, a first electronic amplifier, and a first voltage limiter to process the first electrical signal. Frequency counter 28A may receive the first processed electrical signal and determine a first frequency value corresponding to the first processed electrical signal. In some cases, the first frequency value represents a mechanical vibration frequency of the first DETF structure of proof mass assembly 16, which guides the first modulated optical signal ultimately received by photoreceiver 24A.

In addition to transmitting the first processed electrical signal to frequency counter 28A, feedback unit 26A may transmit the first processed electrical signal to EOM 22A. In turn, EOM 22A may modulate the optical signal emitted by light-emitting device 12 based on the first processed electrical signal, where the first modulated optical signal is transmitted to photoreceiver 24A via the first DETF structure of proof mass assembly 16, thus completing the first positive feedback loop. As such, a future mechanical vibration frequency of the first DETF structure depends, at least in part, on a current mechanical vibration frequency of the first DETF structure. The first modulated optical signal may, in some cases, induce mechanical vibration in the first DETF structure more efficiently than an unmodulated optical signal. In this way, EOM 22A may improve an operating efficiency of accelerometer system 10.

Additionally, in some examples, the second positive feedback loop may determine a second frequency value. For example, light-emitting device 12 may emit an optical signal, EOM 22B may modulate the optical signal to obtain a second modulated optical signal, and EOM 22B may transmit the second modulated optical signal to proof mass assembly 16. Proof mass assembly 16, in some examples, includes a second DETF structure (not illustrated in FIG. 1) configured to guide the second modulated optical signal. The second DETF structure may act as an optical waveguide, where the second modulated optical signal propagates from a distal end of the second DETF structure to a proximal end of the second DETF structure, and subsequently propagates from the proximal end of the second DETF structure to the distal end of the second DETF structure before exiting proof mass assembly 16. As the second modulated optical signal propagates through the second DETF structure, the second modulated optical signal may both induce a mechanical vibration in the second DETF structure and retain one or more parameters (e.g., the mechanical vibration frequency) associated with the second DETF structure.

Proof mass assembly 16 may include a second anchor structure which secures the second DETF structure to the frame, enabling the second DETF structure to suspend the proof pass within the frame. The second anchor structure may be perpendicular (i.e., normal) to the second DETF structure. In some examples, the second anchor structure includes a fourth portion connected to the frame, a fifth portion connected to the frame, and a sixth portion between the fourth portion and the fifth portion. The sixth portion may include a second set of connecting structures (not illustrated in FIG. 1), each connecting structure of the second set of connecting structures connecting the fourth portion and the fifth portion. Each connecting structure of the second set of connecting structures may be perpendicular to the second DETF structure. Each connecting structure of the second set of connecting structures may be connected to the second DETF structure, enabling the second modulated optical signal to propagate through the second set of connecting structures via the second DETF structure. Additionally, in some examples, the second anchor structure may include a single portion including the second set of connecting structures, where both ends of each connecting structure of the second set of connecting structures are connected to the frame.

In some examples, the second anchor structure and the second DETF structure may form a cross shape (†), the ends of the second anchor structure (e.g., the ends of the "arms" of the cross shape) being connected to the frame, and the proximal end (e.g., the "bottom" of the cross shape) of the second DETF structure being connected to the proof mass. The distal end (e.g., the "top" of the cross shape) of the second DETF structure may be suspended such that a second space exists between the distal end of the second DETF structure and the frame. In some examples, the second modulated optical signal crosses the frame via an optical fiber and couples across the second space to the distal end of the second DETF structure. Subsequently, the second modulated optical signal propagates through a distal portion of the second DETF structure which is connected to the second set of connecting structures to a proximal end of the second DETF structure. The second modulated optical signal may propagate back through the length of the second DETF structure, passing across the second set of connecting structures a second time before coupling across the second space and crossing the frame via an optical fiber.

Photoreceiver 24B may receive the second modulated optical signal from proof mass assembly 16, where properties of the second modulated optical signal received by photoreceiver 24B may be affected by mechanical vibrations of a second DETF structure of proof mass assembly 16. Photoreceiver 24B converts the second modulated optical signal into a second electrical signal and transmits the second electrical signal to feedback unit 26B. In some examples, feedback unit 26B processes the second electrical signal to obtain a second processed electrical signal. For example, feedback unit 26B may use any combination of a second band pass filter, a second phase shifter, a second electronic amplifier, and a second voltage limiter to process the second electrical signal. Frequency counter 28B may receive the second processed electrical signal and determine a second frequency value corresponding to the second processed electrical signal. In some cases, the second frequency value represents a mechanical vibration frequency of the second DETF structure of proof mass assembly 16, which guides the second modulated optical signal ultimately received by photoreceiver 24B.

In addition to transmitting the second processed electrical signal to frequency counter 28B, feedback unit 26B may transmit the second processed electrical signal to EOM 22B. In turn, EOM 22B may modulate the optical signal emitted by light-emitting device 12 based on the second processed electrical signal, where the second modulated optical signal is transmitted to photoreceiver 24B via the second DETF structure of proof mass assembly 16, thus completing the second positive feedback loop. As such, a future mechanical vibration frequency of the second DETF structure depends, at least in part, on a current mechanical vibration frequency of the second DETF structure. The second modulated optical signal may, in some cases, induce mechanical vibration in the second DETF structure more efficiently than an unmodulated optical signal. In this way, EOM 22B may improve an operating efficiency of accelerometer system 10.

Processing circuitry 30 may be configured to calculate, based on the first frequency value, a first acceleration value. In some examples, to calculate the first acceleration value, processing circuitry 30 may subtract a baseline frequency value from the first frequency value to obtain a first frequency difference value. The baseline frequency value may represent a resonant mechanical frequency of the first DETF structure of proof mass assembly 16 while the proof mass is not displaced from a resting point along the proof mass displacement axis. In other words, the modulated optical signal emitted by EOM 22A may induce the first DETF structure to vibrate at the baseline frequency value while the proof mass is not displaced from the resting point along the proof mass displacement axis. As such, when the object is not accelerating, the first frequency difference value may be equal to zero since the first acceleration value—which represents the mechanical frequency of the first DETF structure—is equal to the baseline frequency value when the proof mass is not displaced (i.e., the object carrying accelerometer system 10 is not accelerating). The first frequency difference value, in some examples, may be correlated with an acceleration of the object. In other words, an increase of a magnitude of the first frequency difference value may indicate an increase in the acceleration of the object and a decrease of a magnitude of the first frequency difference value may indicate decrease in the acceleration of the object.

Additionally, processing circuitry 30 may be configured to calculate a second acceleration value based on the second acceleration value. In some examples, to calculate the second acceleration value, processing circuitry 30 may subtract a baseline frequency value from the second frequency value to obtain a second frequency difference value. The second frequency difference value, in some examples, may be correlated with an acceleration of the object. In other words, an increase of a magnitude of the second frequency difference value may indicate an increase in the acceleration of the object and a decrease of a magnitude of the second frequency difference value may indicate decrease in the acceleration of the object. The first acceleration value and the second acceleration value, which are calculated by processing circuitry 30, may, in some cases, be approximately equal.

It may be desirable for accelerometer system 10 to possess a high sensitivity in order to improve a quality of the acceleration values measured by accelerometer system 10 and/or increase a range of acceleration values in which accelerometer system 10 can accurately determine. To increase a level of sensitivity in accelerometer system 10, it may be beneficial to increase a mechanical quality factor of the DETF structures of proof mass assembly 16 (i.e., decrease an amount of damping which occurs while the DETF structures vibrate), increase a power of the optical signal emitted by light-emitting device 12, or any combination thereof. One way to increase the mechanical quality factor of the DETF structures is to decrease a pressure within a space in which the DETF structures are located. More specifically, to achieve a high mechanical quality factor, it may be beneficial to house the DETF structures in a vacuum or a near-vacuum environment. However, in some cases, housing the DETF structures in a vacuum or a near-vacuum environment while increasing the power of the optical signal emitted by light-emitting device 12 may cause components of accelerometer system 10 to heat up, and the optical signal may exhibit frequency nonlinearities caused by thermal effects—not by acceleration. Such nonlinearities may cause distortions in the accelerometer data which may be referred to as optical "shark fin" distortions, and the distortions may negatively affect the accuracy of the accelerometer data.

In some examples, housing 32 encloses light-emitting device 12, circuit 14, and proof mass assembly 16. Housing 32, in some examples, includes a crystalline material such as Silicon. Additionally, in some examples, housing 32 includes a first layer including an amorphous solid material and a second layer including a crystalline material.

In some examples, a mechanical quality factor associated with the DETF structures is within a range between 5,000 and 2,000,000. In some examples, light-emitting device 12 emits the optical signal at a power value within a range between 1 nanowatt (nW) and 10,000 nW.

In some examples, accelerometer system 10 includes an opto-mechanical vibrating beam accelerometer as a self-oscillating electro-opto-mechanical oscillator. Two pairs of nanoscale dielectric beams may form a pair of DETF structures that rigidly anchor a thin film proof mass to a frame. Each DETF structure of the pair of DETF structures may have an optical resonance with a spectral width within a range bounded inclusively by 0.05 nanometers (nm) and 1 nm (e.g., 0.1 nm). In some examples, the DETF structures may be excited and driven by the optical signal emitted by light-emitting device 12, where the optical signal is coupled into an optically active portion of the DETF structures via a waveguide. Mechanical motion of the DETF structures, driven by the amplitude-modulated optical signal, may have a reciprocal effect on the optical signal in that the mechanical motion modulates the optical signal. In other words, an optical signal may both induce mechanical vibration in the DETF structures and measure a mechanical vibration frequency of the DETF structures corresponding to the vibration caused by the optical signal.

The optical signal may be outcoupled from the DETF structures. In some examples, the laser field is reflected out of the DETF structures. In other examples, the optical signal passes through the DETF structures in transmission and the optical signal is incident on photoreceivers 24 with suitable bandwidth to detect an Alternating Current (AC) photocurrent at the modulation frequency of the optical signal. The electrical signals produced by photoreceivers 24 are conditioned by the feedback electronics (e.g., filtered, amplified, phase shifted, and voltage limited) and the electrical signals are output to respective drive ports of EOMs 22 to modulate the optical signal. In this way, accelerometer system 10 may realize closed loop electro-opto-mechanical self-oscillation at a mechanical resonance frequency (e.g., 1.33 megahertz (MHz)) under standard conditions of positive feedback with 0 degrees phase shift and 0 dB round-trip signal gain. Accelerations experienced by accelerometer system 10 may cause minute displacements of the proof mass of proof mass assembly 16, generating stresses in the DETF structures which shift mechanical resonance frequencies of the DETF structures—higher for tensile stresses, lower for compressive stresses. As such, an instantaneous frequency of each DETF structure may be monitored by counting the frequency of a respective electrical signal using a frequency counters 28. To generate an acceleration value, processing circuitry 30 may, in some examples, apply scale factors to measured frequency shifts in mechanical vibrating frequencies of the DETF structures.

Figure 2:
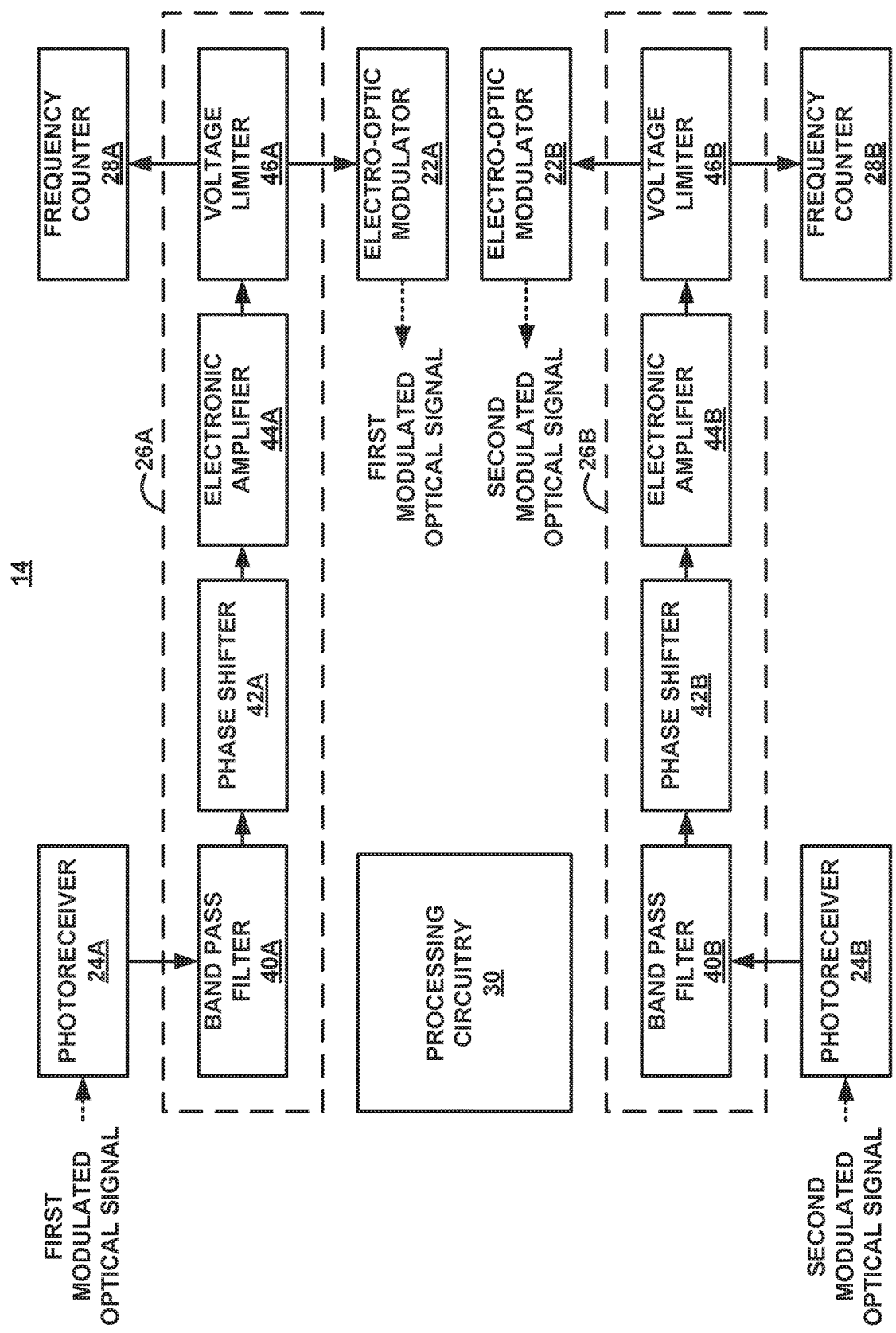
FIG. 2 is a block diagram illustrating the circuit of FIG. 1, in accordance with one or more techniques of this disclosure.

FIG. 2 is a block diagram illustrating circuit 14 of FIG. 1, in accordance with one or more techniques of this disclosure. As illustrated in FIG. 1, circuit 14 includes EOMs 22, photoreceivers 24, feedback units 26, frequency counters 28, and processing circuitry 30. Feedback units 26 include band pass filters 40A, 40B (collectively, "band pass filters 40"), phase shifters 42A, 42B (collectively, "phase shifters 42"), electronic amplifiers 44A, 44B (collectively, "electronic amplifiers 44), and voltage limiters 46A, 46B (collectively, "voltage limiters 46). The first feedback loop includes band pass filter 40A, phase shifter 42A, electronic amplifier 44A, and voltage limiter 46A). The second feedback loop includes band pass filter 40B, phase shifter 42B, electronic amplifier 44B, and voltage limiter 46B.

In some examples, circuit 14 may be configured to receive modulated optical signals from proof mass assembly 16, convert the optical signals into electrical signals, process the electrical signals, analyze the processed electrical signals to determine acceleration values, and use the processed electrical signals to modulate optical signals, thus completing the first feedback loop and the second feedback loop. For example, photoreceiver 24A may receive a first modulated optical signal from a first DETF structure of proof mass assembly 16. The first modulated optical signal may include a frequency component associated with the first DETF structure itself, such as a vibration frequency of the first DETF structure. Photoreceiver 24A may convert the first modulated optical signal into a first electrical signal, preserving the frequency component indicative of the vibration frequency of the first DETF structure. Photoreceiver 24 may transmit the first electrical signal to feedback unit 26A, which includes band pass filter 40A, phase shifter 42A, electronic amplifier 44A, and voltage limiter 46A.

Band pass filter 40A may be an electronic filter that attenuates frequencies outside of a frequency range and "passes" frequencies within the frequency range. In some examples, band pass filter 40A includes any combination of passive filters, active filters, infinite impulse response (IIR) filters, finite impulse response (FIR) filters, Butterworth filters, Chebyshev filters, elliptic filters, Bessel filters, Gaussian filters, Legendre filters, or Linkwitz-Riley filters. In some examples, band pass filter 40A includes a combination of a high pass filter which passes frequencies above a high pass cutoff point and a low pass filter which passes frequencies below a low pass cutoff point. In some cases, band pass filter 40A passes frequencies within a range between 100 kilohertz (kHz) and 10,000 kHz. Additionally, phase shifter 42A may be configured to shift a phase of the first electrical signal. Phase may be characterized as a position of an instant on a waveform cycle of a periodic waveform. For example, the first electrical signal may include periodic waveforms which represent frequency components of the first electrical signal. A maximum peak of a sine wave for example, may be at a different phase than a minimum peak, or a zero crossing of the sine wave. In some examples, phase shifter 42A may "delay" the first electrical signal by a time value in order to shift a timeline in which frequency components of the first electrical signal oscillate.

Electronic amplifier 44A may amplify the first electrical signal such that an amplitude of the first electrical signal is increased by a gain factor. In other words, electronic amplifier 44A may increase a power of the first electrical signal. By amplifying the first electrical signal using electronic amplifier 44A, circuit 14 may improve an ability of processing circuitry 30 to analyze the first electrical signal, and modulate the optical signal emitted by light-emitting device 12 using EOM 22A. Electronic amplifier 44A may include, in some cases, power amplifiers, operational amplifiers, or transistor amplifiers, or any combination thereof. Additionally, in some examples, Voltage limiter 46A is configured to limit a voltage of the first electrical signal to a maximum voltage value. In other words, voltage limiter 46A may prevent the first electrical signal from exceeding the maximum voltage value, meaning that the first processed electrical signal produced by feedback unit 26A may not exceed the maximum voltage value.

In some examples, the first electrical signal may pass through feedback unit 26A in an order from band pass filter 40A, to phase shifter 42A, to electronic amplifier 44A, to voltage limiter 46A, as illustrated in FIG. 2. However, the order illustrated in FIG. 2 is not meant to be limiting. Band pass filter 40A, phase shifter 42A, electronic amplifier 44A, and voltage limiter 46A may be arranged to process the first electrical signal in any valid order.

In some examples, feedback unit 26A may transmit the first processed electrical signal to frequency counter 28A. Frequency counter 28A may determine a first frequency value, and processing circuitry 30 may determine a first acceleration value based on the first frequency value. Additionally, feedback unit 26A may transmit the first processed electrical signal to EOM 22A and EOM 22A may modulate the optical signal emitted by light-emitting device 12 based on the first processed electrical signal. In this way, proof mass assembly 16, photoreceiver 24A, band pass filter 40A, phase shifter 42A, electronic amplifier 44A, voltage limiter 46A, EOM 22A, and frequency counter 28A are a part of the first positive feedback loop which produces the first acceleration value associated with the object including accelerometer system 10.

In some examples, the components of feedback unit 26B (e.g., band pass filter 40B, phase shifter 42B, electronic amplifier 44B, and voltage limiter 46B) may be substantially similar to the respective components of feedback unit 26A. As such, the second positive feedback loop may be substantially similar to the first positive feedback loop.

Figure 3:
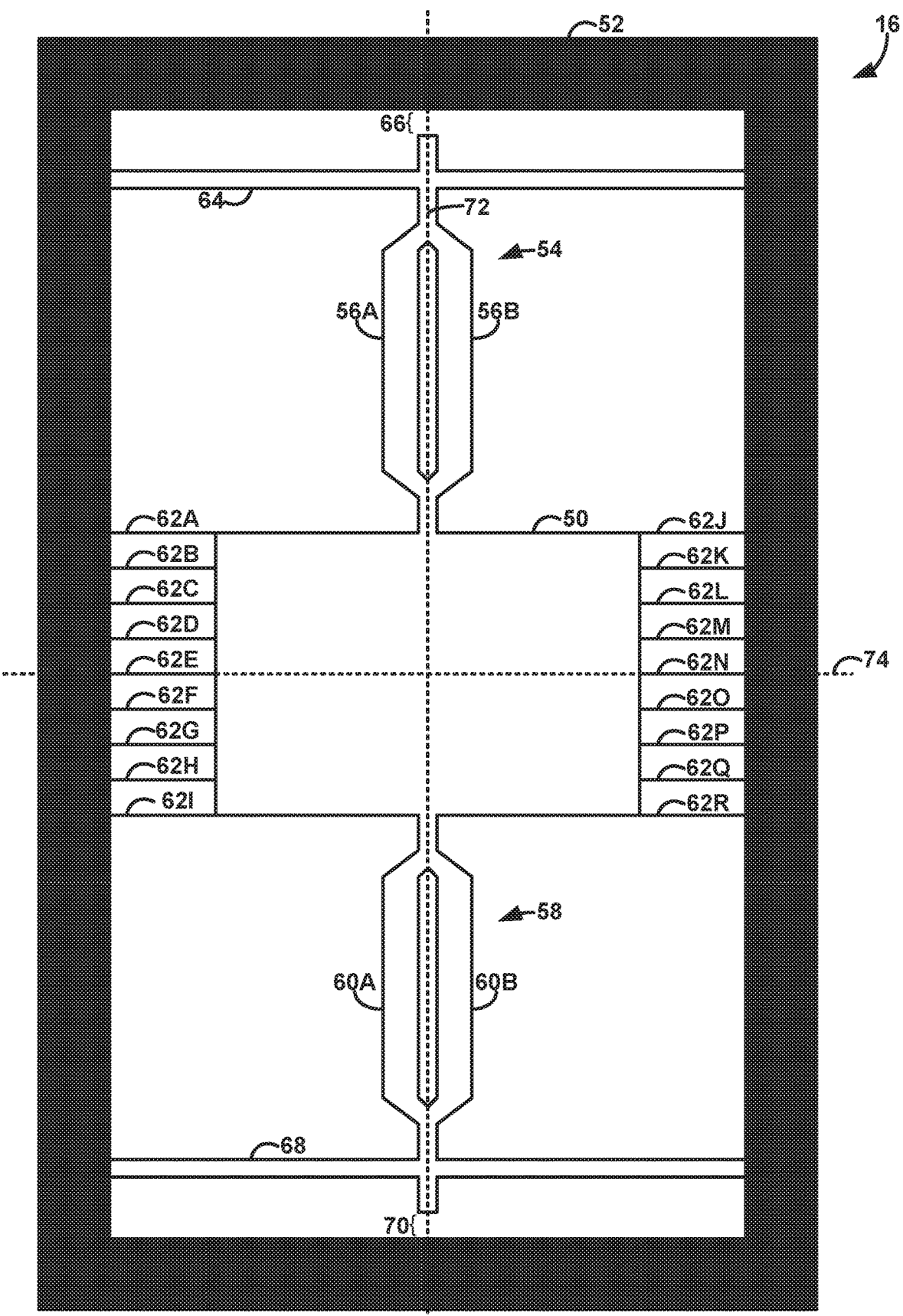
FIG. 3 illustrates a conceptual diagram of the proof mass assembly of FIG. 1 including a proof mass suspended within a frame by a first double-ended tuning fork (DETF) structure, a second DETF structure, and a set of tethers, in accordance with one or more techniques of this disclosure.

FIG. 3 illustrates a conceptual diagram of proof mass assembly 16 including a proof mass 50 suspended within a frame 52 by a first DETF structure 54, a second DETF structure 58, and a set of tethers 62A-62R, in accordance with one or more techniques of this disclosure. As illustrated in FIG. 3, proof mass assembly 16 includes proof mass 50, frame 52, first DETF structure 54 including a first pair of mechanical beams 56A, 56B (collectively, "first pair of mechanical beams 56"), second DETF structure 58 including a second pair of mechanical beams 60A, 60B (collectively, "second pair of mechanical beams 60"), tethers 62A-62R (collectively, "tethers 62"), first anchor structure 64, and second anchor structure 68. Proof mass assembly 16 is aligned relative to proof mass displacement axis 72 and proof mass resting plane 74, as illustrated in FIG. 3.

Proof mass assembly 16 is a mechanical component of electro-opto-mechanical accelerometer system 10. Since accelerometer system 10 measures acceleration, which is a rate in which a velocity of an object changes over time, it may be beneficial to include proof mass assembly 16 so that acceleration can be measured based on a physical object such as proof mass 50. For example, accelerometer system 10, which includes proof mass assembly 16 may be fixed to or included within an object. Consequently, as the object accelerates at an acceleration value, proof mass assembly 16 may also accelerate at the acceleration value. Acceleration may affect a position of proof mass 50 within frame 52 relative to proof mass displacement axis 72 and proof mass resting plane 74. For example, non-zero acceleration may cause proof mass 50 to be displaced from proof mass resting plane 74 along proof mass displacement axis 72. As described herein, if proof mass 50 is "displaced," a center of mass of proof mass 50 is displaced relative to frame 52. Increasing a magnitude of acceleration may cause the displacement of proof mass 50 along proof mass displacement axis 72 to increase. Additionally, decreasing a magnitude of acceleration may cause the displacement of proof mass 50 along proof mass displacement axis 72 to decrease.

In some examples, proof mass 50 takes the form of a patterned thin film, where the thin film has a mass within a range between 100 nanograms (ng) and 10,000 ng. Additionally, in some cases, the thin film has a thickness within a range between 1 nm and 5,000 nm. Proof mass 50 may be suspended within frame 52 along proof mass displacement axis 72 by first DETF structure 54 and second DETF structure 58 (collectively, "DETF structures 54, 58"). First DETF structure 54 and second DETF structure 58 may each have a high level of stiffness. For example, a scale factor of each of first DETF structure 54 and second DETF structure 58 may be within a range between 0.1 parts per million per gravitational force equivalent (ppm/G) and 10 ppm/G. In this way, proof mass assembly 16 may include a very light proof mass 50 which is secured by very stiff DTEF structures 54, 58. As such, a very high acceleration (e.g., 100,000 m/s$^2$) may cause proof mass 50 to be displaced along the proof mass displacement axis 72 by a very small displacement value, for example. In some examples, proof mass 50 is displaced along the proof mass displacement axis 72 by a displacement value of up to 100 nm.

In order to generate acceleration values indicative of the acceleration of the object in which accelerometer system 10 is fixed to, accelerometer system 10 may quantify, using optical signals, the displacement of proof mass 50 within frame 52. To quantify the displacement of proof mass 50, accelerometer system 10 may measure and analyze mechanical properties of DETF structures 54, 58, such as mechanical vibrating frequency values corresponding to DETF structures 54, 58. Indeed, since DETF structures 54, 58 suspend proof mass 50, the mechanical vibrating frequencies of DETF structures 54, 58 may be affected due to a displacement of proof mass 50. For example, a displacement of proof mass 50 towards first DETF structure 54 and away from second DETF structure 58 may cause proof mass 50 to apply a compression force to first DETF structure 54 and apply a tension force to second DETF structure 58. Such a compression force may cause the mechanical vibration frequency of first DETF structure 54 to decrease and such a tension force may cause the mechanical vibration force of second DETF structure 58 to increase. Changes in the mechanical vibration frequencies of DETF structures 54, 58 may, in some examples, be proportional to the displacement of proof mass 50 relative to frame 52 in the direction of proof mass displacement axis 72. In some examples, Accelerometer system 10 may measure changes in the mechanical vibration frequencies of DETF structures 54, 58 by transmitting modulated optical signals through DETF structures 54, 58.

First DETF structure 54 may include, for example, the first pair of mechanical beams 56 separated by a gap. The first pair of mechanical beams 56 may include photonic crystal mechanical beams that are configured for guiding a first modulated optical signal while first DETF structure 54 is oscillating at a first mechanical vibrating frequency. In some cases, the first modulated optical signal is emitted by light-emitting device 12 (illustrated in FIG. 1), and the first modulated optical signal itself induces vibration in first DETF structure 54. Additionally, the vibration of the first DETF structure 54 may affect certain properties of the first modulated optical signal such that the mechanical vibrating frequency of the first DETF structure 54 is reflected in the first modulated optical signal. In this way, the first modulated optical signal may cause the mechanical vibration in the first DETF structure 54 and enable accelerometer system 10 to measure the mechanical vibration frequency of the first DETF structure 54 based on the first modulated optical signal.

First DETF structure 54 is secured to frame 52 by anchor structure 64, enabling first DETF structure 54 to suspend proof mass 50 within frame 52. As seen in FIG. 3, first DETF structure 54 and anchor structure 64 may form a cross shape, the ends of first anchor structure 64 (e.g., the ends of the "arms" of the cross shape) being connected to frame 52, and the proximal end (e.g., the "bottom" of the cross shape) of first DETF structure 54 being connected to proof mass 50. The distal end (e.g., the "top" of the cross shape) of first DETF structure 54 may be suspended such that first space 66 exists between the distal end of first DETF structure 54 and frame 52.

Additionally, second DETF structure 58 may include, for example, the second pair of mechanical beams 60 separated by a gap. The second pair of mechanical beams 60 may include photonic crystal mechanical beams that are configured for guiding a second modulated optical signal while second DETF structure 58 is oscillating at a second mechanical vibrating frequency. In some cases, the second modulated optical signal is emitted by light-emitting device 12 (illustrated in FIG. 1), and the second modulated optical signal itself induces vibration in second DETF structure 58. Additionally, the vibration of the second DETF structure 58 may affect certain properties of the second modulated optical signal such that the mechanical vibrating frequency of the second DETF structure 58 is reflected in the second modulated optical signal. In this way, the second modulated optical signal may cause the mechanical vibration to occur in the second DETF structure 58 and enable accelerometer system 10 to measure the mechanical vibration frequency of the second DETF structure 58 based on the second modulated optical signal.

Second DETF structure 58 is secured to frame 52 by anchor structure 68, enabling second DETF structure 58 to suspend proof mass 50 within frame 52. As seen in FIG. 3, second DETF structure 58 and anchor structure 68 may form a cross shape, the ends of first anchor structure 68 (e.g., the ends of the "arms" of the cross shape) being connected to frame 52, and the proximal end (e.g., the "bottom" of the cross shape) of second DETF structure 58 being connected to proof mass 50. The distal end (e.g., the "top" of the cross shape) of second DETF structure 58 may be suspended such that second space 70 exists between the distal end of second DETF structure 58 and frame 52.

Proof mass 50 may be fixed to frame 52 by tethers 62. In some examples, tethers 62 may suspend proof mass 50 in proof mass resting plane 74 such that the center of mass of proof mass 50 does not move within proof mass resting plane 74 relative to frame 52. Proof mass displacement axis 72 may represent a single axis (e.g., x-axis) of a Cartesian space, and proof mass resting plane 74 may represent two axes (e.g., y-axis and z-axis) of the Cartesian space. Since tethers 62 may restrict proof mass 50 from being displaced relative to proof mass resting plane 74, in some examples, proof mass 50 may only be displaced along the proof mass displacement axis 72. Accelerometer system 10 may measure an acceleration based on mechanical vibrating frequencies of DETF structures 54, 58, where the mechanical vibrating frequencies are related to an amount of displacement of proof mass 50 along proof mass displacement axis 72. In this way, the acceleration determined by accelerometer system 10 may be an acceleration relative to proof mass displacement axis 72.

First DETF structure 54 may include a proximal end that is proximate to proof mass 50, and a distal end that is separated from frame 52 by a first space 66. First anchor structure 64 may help to suspend first DETF structure 54 within frame 52 such that the first DETF structure 54 is perpendicular to proof mass resting plane 74. In some examples, first anchor structure 64 extends perpendicularly to proof mass displacement axis 72 between two sidewalls of frame 52. An optical signal may travel through frame 52 via a first optical fiber (not illustrated in FIG. 3), the optical signal being coupled across first space 66 to first DETF structure 54.

For example, a first modulated optical signal emitted by EOM 22A may travel through frame 52 via the first optical fiber and couple across the first space 66 to the distal end of first DETF structure 54. The first modulated optical signal may propagate through first DETF structure 54 from the distal end of first DETF structure 54 to the proximal end of first DETF structure 54, crossing a junction between first anchor structure 64 and first DETF structure 54 for a first time. Subsequently, the first modulated optical signal may propagate back through the first DETF structure 54 from the proximal end of first DETF structure to the distal end of first DETF structure 54, crossing the junction between first anchor structure 64 and first DETF structure 54 for a second time. At the junction between first anchor structure 64 and first DETF structure 54, first anchor structure 64 may include a first set of connecting structures, where each connecting structure of the first set of connecting structures is perpendicular to first DETF structure 54 and each connecting structure of the first set of connecting structures is perpendicular to other connecting structures of the first set of connecting structures. For example, the first set of connecting structures may each be connected to first DETF structure along proof mass displacement axis 72 such that a space exists between each pair of consecutive connecting structures of the first set of connecting structures.

As the first modulated optical crosses the junction between first anchor structure 64 and first DETF structure 54, the first set of connecting structures and the respective spaces between the first set of connecting structures may cause a multi-mode interference pattern to form at the junction between first anchor structure 64 and first DETF structure 54, the multi-mode interference pattern improving a single-pass optical transmission efficiency associated with the junction between first anchor structure 64 and first DETF structure 54. In this way, the first set of connecting structures may ensure that both of the mechanical quality factor of first DETF structure 54 and the multi-mode interference pattern associated with the junction between first anchor structure 64 and first DETF structure 54 remain at high values, thus improving a sensitivity of accelerometer system 10.

Second DETF structure 58 may include a proximal end that is proximate to proof mass 50, and a distal end that is separated from frame 52 by a second space 70. Second anchor structure 68 may help to suspend second DETF structure 58 within frame 52 such that the second DETF structure 58 is perpendicular to proof mass resting plane 74. In some examples, second anchor structure 68 extends perpendicularly to proof mass displacement axis 72 between two sidewalls of frame 52. An optical signal may travel through frame 52 via a second optical fiber (not illustrated in FIG. 3), the optical signal being coupled across second space 70 to second DETF structure 58.

For example, a second modulated optical signal emitted by EOM 22B may travel through frame 52 via the second optical fiber and couple across the second space 70 to the distal end of second DETF structure 58. The second modulated optical signal may propagate through second DETF structure 58 from the distal end of second DETF structure 58 to the proximal end of second DETF structure 58, crossing a junction between second anchor structure 68 and second DETF structure 58 for a second time. Subsequently, the second modulated optical signal may propagate back through the second DETF structure 58 from the proximal end of second DETF structure to the distal end of second DETF structure 58, crossing the junction between second anchor structure 68 and second DETF structure 58 for a second time. At the junction between second anchor structure 68 and second DETF structure 58, second anchor structure 68 may include a second set of connecting structures, where each connecting structure of the second set of connecting structures is perpendicular to second DETF structure 58 and each connecting structure of the second set of connecting structures is perpendicular to other connecting structures of the second set of connecting structures. For example, the second set of connecting structures may be each be connected to second DETF structure along proof mass displacement axis 72 such that a space exists between each pair of consecutive connecting structures of the second set of connecting structures.

As the second modulated optical signal crosses the junction between second anchor structure 68 and second DETF structure 58, the second set of connecting structures and the respective spaces between the second set of connecting structures may cause a multi-mode interference pattern to form at the junction between second anchor structure 68 and second DETF structure 58, the multi-mode interference pattern improving a single-pass optical transmission efficiency associated with the junction between second anchor structure 68 and second DETF structure 58. In this way, the second set of connecting structures may ensure that both of the mechanical quality factor of second DETF structure 58 and the multi-mode interference pattern associated with the junction between second anchor structure 68 and second DETF structure 58 remain at high values, thus improving a sensitivity of accelerometer system 10.

Figure 4:
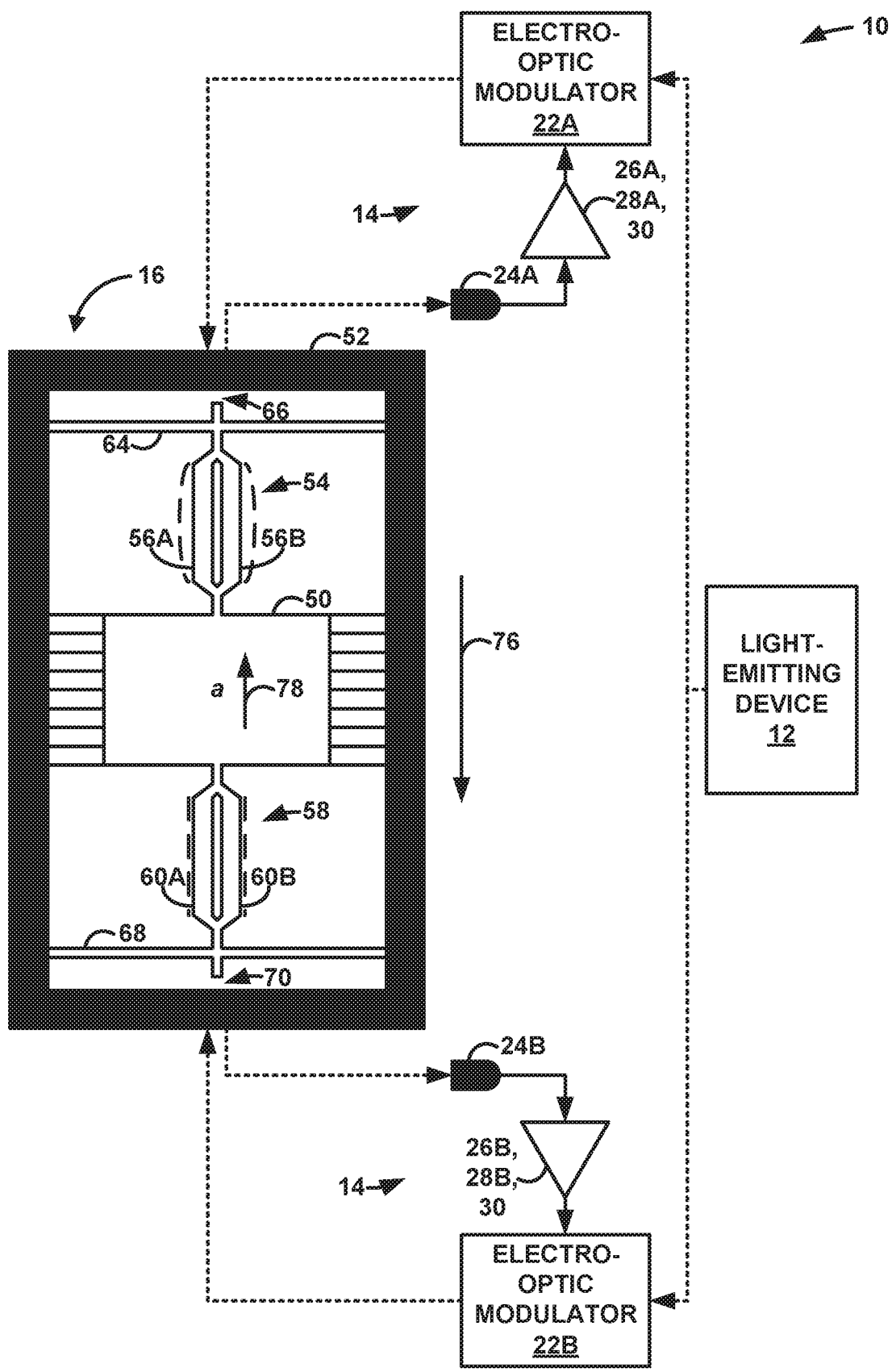
FIG. 4 illustrates a conceptual diagram of the accelerometer system of FIG. 1, in accordance with one or more techniques of this disclosure.

FIG. 4 illustrates a conceptual diagram of accelerometer system 10, in accordance with one or more techniques of this disclosure. The conceptual diagram of FIG. 4 includes light-emitting device 12, components of circuit 14, and proof mass assembly 16.

In some examples, an object may be fixed to accelerometer system 10. The object, in some cases, may accelerate. Accelerometer system 10, including proof mass assembly 16, may accelerate with the object. As proof mass assembly 16 accelerates, proof mass 50 may be displaced relative to frame 52. In the example illustrated in FIG. 4, if proof mass assembly 16 accelerates in direction 76, proof mass 50 is displaced in direction 78. Direction 78, in some examples, is aligned with a proof mass displacement axis (e.g., proof mass displacement axis 72 of FIG. 3. As proof mass 50 is displaced in direction 78 relative to frame 52, proof mass 50 applies a compression force to first DETF structure 54, and proof mass 50 applies a tension force to second DETF structure 58. Such forces may affect mechanical vibrating frequencies of DETF structures 54, 58, where mechanical vibration is induced in first DETF structure 54 and second DETF structure 58 by EOM 22A and EOM 22B, respectively. For example, the compression force applied to first DETF structure 54 may cause the mechanical vibration frequency of first DETF structure 54 to decrease, and the tension force applied to second DETF structure 58 may cause the mechanical vibration frequency of second DETF structure 58 to increase.

Light-emitting device 12 may emit an optical signal to EOMs 22. In turn, EOM 22A and EOM 22B may modulate the optical signal according to a first processed electrical signal produced by feedback unit 26A and a second processed electrical signal produced by feedback unit 26B, respectively. As such, EOM 22A produces a first modulated optical signal and EOM 22B produces a second modulated optical signal. EOM 22A, for example, may transmit the first modulated optical signal to proof mass assembly 16. The first modulated optical signal may cross frame 52. In some examples, frame 52 includes an aperture or another opening bridged by a first optical fiber which allows the first modulated optical signal to pass. Additionally, the first modulated optical signal may couple across first space 66 to the first DETF structure 54. The first modulated optical signal may propagate through first DETF structure 54, inducing mechanical vibration in first DETF structure 54. In some examples, the first modulated optical signal propagates the length of first DETF structure 54 towards proof mass 50 along mechanical beams 56 and subsequently propagates the length of first DETF structure 54 away from proof mass 50 along mechanical beams 56. By propagating the length of first DETF structure 54, the first modulated optical signal may retain information indicative of mechanical properties (e.g., the mechanical vibration frequency) of first DETF structure 54. After the first modulated optical signal propagates through first DETF structure 54, the first modulated optical signal may exit proof mass assembly 16 via first space 66 and the first optical fiber of frame 52.

After exiting proof mass assembly 16, the first modulated optical signal may arrive at photoreceiver 24A. Photoreceiver 24A converts the first modulated optical signal into a first electrical signal, and feedback unit 26A processes the first electrical signal to produce a first processed electrical signal. Frequency counter 28A may determine a first frequency value corresponding to the first processed electrical signal, where the first frequency value is indicative of the mechanical vibrating frequency of the first DETF structure 54. Processing circuitry 30 may subtract a baseline frequency value from the first frequency value to obtain a first frequency difference value and calculate a first acceleration value based on the first frequency difference value. EOM 22A may use the first processed electrical signal to modulate the optical signal emitted by light-emitting device 12.

EOM 22B, for example, may transmit the second modulated optical signal to proof mass assembly 16. The second modulated optical signal may cross frame 52. In some examples, frame 52 includes an aperture or another opening bridged by a second optical fiber which allows the second modulated optical signal to pass. Additionally, the second modulated optical signal may couple across second space 70 to the second DETF structure 58. The second modulated optical signal may propagate through second DETF structure 58, inducing mechanical vibration in second DETF structure 58. In some examples, the second modulated optical signal propagates the length of second DETF structure 58 towards proof mass 50 along mechanical beams 56 and subsequently propagates the length of second DETF structure 58 away from proof mass 50 along mechanical beams 56. By propagating the length of second DETF structure 58, the second modulated optical signal may retain information indicative of mechanical properties (e.g., the mechanical vibration frequency) of second DETF structure 58. After the second modulated optical signal propagates through second DETF structure 58, the second modulated optical signal may exit proof mass assembly 16 via second space 70 and the second optical fiber of frame 52.

After exiting proof mass assembly 16, the second modulated optical signal may arrive at photoreceiver 24B. Photoreceiver 24B converts the second modulated optical signal into a second electrical signal, and feedback unit 26A processes the second electrical signal to produce a second processed electrical signal. Frequency counter 28B may determine a second frequency value corresponding to the second processed electrical signal, where the second frequency value is indicative of the mechanical vibrating frequency of the second DETF structure 58. Processing circuitry 30 may subtract a baseline frequency value from the second frequency value to obtain a second frequency difference value and calculate a second acceleration value based on the second frequency difference value. EOM 22B may use the second processed electrical signal to modulate the optical signal emitted by light-emitting device 12.

Figure 5A:
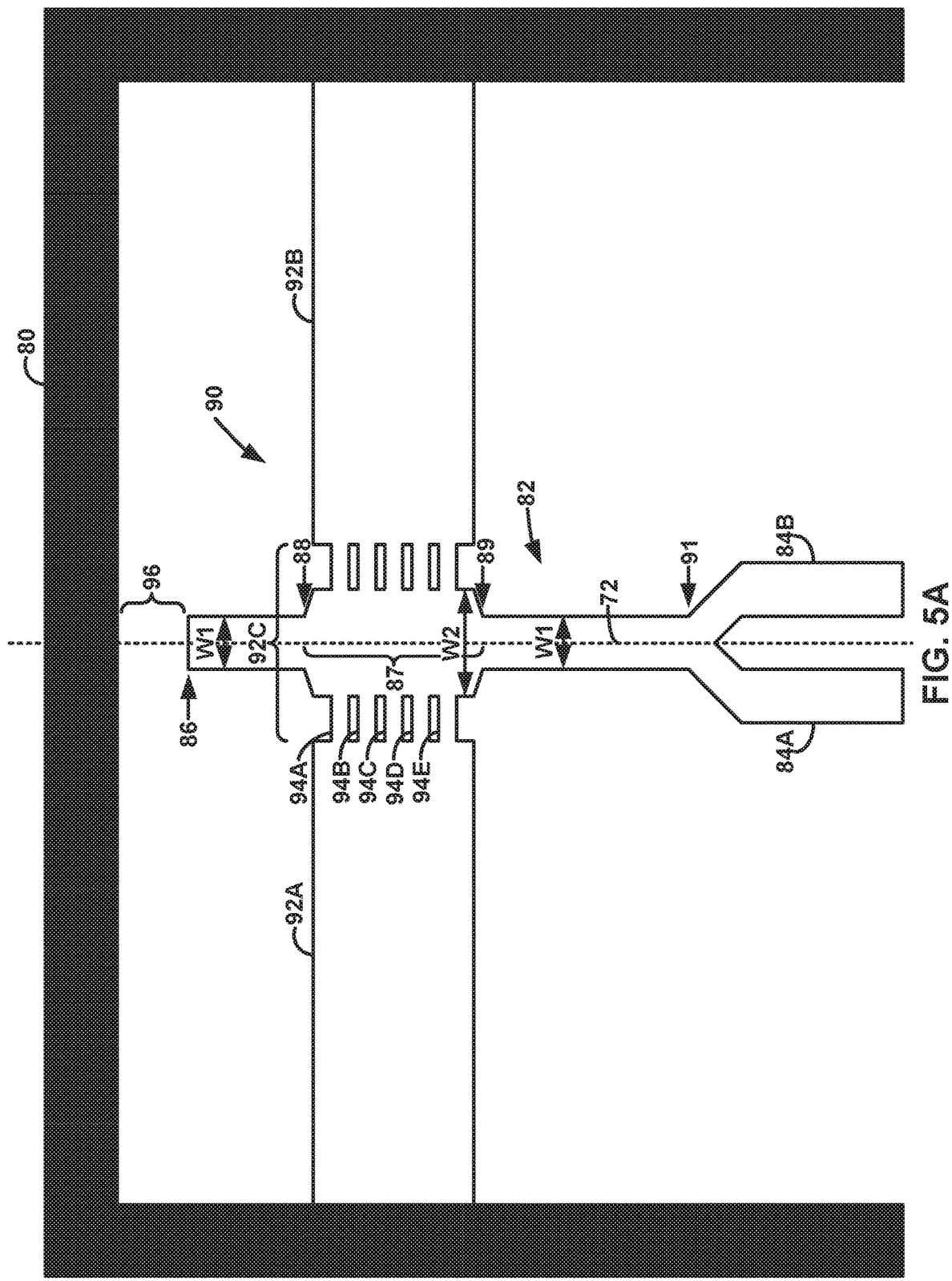
FIG. 5A is a conceptual diagram of a distal portion of a DETF structure and an anchor structure enclosed in a frame, in accordance with one or more techniques of this disclosure.

FIG. 5A is a conceptual diagram of a distal portion of a DETF structure 82 and an example anchor structure 90 enclosed in a frame 80, in accordance with one or more techniques of this disclosure. In some examples, frame 80 is an example of frame 52 of FIGS. 3-4. In some examples, DETF structure 82 is an example of first DETF structure 54 of FIGS. 3-4 and anchor structure 90 is an example of first anchor structure 64 of FIGS. 3-4. Additionally, in some examples, DETF structure 82 is an example of second DETF structure 58 and anchor structure 90 is an example of second anchor structure 68 of FIGS. 3-4. As illustrated in FIG. 5A, DETF structure 82 includes first mechanical beam 84A and second mechanical beam 84B (collectively, "mechanical beams 84"). Additionally, as illustrated in FIG. 5A, anchor structure 90 includes a first portion 92A, a second portion 92B, and a third portion 92C. Third portion 92C may include connecting structures 94A-94E (collectively, "connecting structures 94").

Anchor structure 90 and DETF structure 82 may be connected such that anchor structure 90 and DETF structure 82 form a cross shape, the ends of anchor structure 90 (e.g., the ends of the "arms" of the cross shape) being connected to frame 80, and the proximal end (e.g., the "bottom" of the cross shape) of the DETF structure 82 being connected to a proof mass (e.g., proof mass 50 of FIGS. 3-4). Distal end 86 (e.g., the "top" of the cross shape) of the first DETF structure may be suspended such that a first space exists between the distal end of the first DETF structure and the frame. The area in which connecting structures 94 intersect with DETF structure 82 may be referred to herein as the "junction" of anchor structure 90 and DETF structure 82. In some examples, DETF structure 82 includes any one or more of silicon, silicon nitride, silicon carbide, aluminum nitride, silicon dioxide, quartz and other crystalline materials. Additionally, in some examples, anchor structure 90 includes any one or more of silicon, silicon nitride, and other crystalline materials.

The junction of DETF structure 82 and anchor structure 90 may be located at the optical interference zone 87 of DETF structure 82 which extends from a distal end 88 of optical interference zone 87 to a proximal end 89 of optical interference zone 87. A portion of DETF structure 82 distal to optical interference zone 87 (e.g., the portion between distal end 86 of DETF structure 82 and distal end 88 of optical interference zone 87) may have a maximum width W1. Additionally, a portion of DETF structure 82 proximal to optical interference zone 87 (e.g., the portion between proximal end 89 of optical interference zone 87 and distal end 91 of mechanical beams 84) may have a maximum width W1. Optical interference zone 87 may have a maximum width W2, where W2 is greater than W1. In this way, optical interference zone 87 may have a greater width than portions of DETF structure 82 immediately proximal and immediately distal to optical interference zone 87.

DETF structure 82 may be configured to guide a modulated optical signal such that DETF structure acts as an optical waveguide. For example, the modulated optical signal may cross frame 80 via an optical fiber (not illustrated in FIG. 5A) and couple across space 96 to the distal end 86 of DETF structure 82. The modulated optical signal may propagate through DETF structure 82, crossing the junction of anchor structure 90 and DETF structure 82 for a first time, and arriving at the proximal end (not illustrated in FIG. 5A of DETF structure 82. Subsequently, the modulated optical signal may propagate through DETF structure 82 from the proximal end to the distal end 86, crossing the junction of anchor structure 90 and DETF structure 82 for a second time. As the modulated optical signal propagates through DETF structure 82, the modulated optical signal may induce mechanical vibration in mechanical beams 84. Additionally, as the modulated optical signal propagates through DETF structure 82, the modulated optical signal may be altered based on one or more parameters corresponding to DETF structure 82, such as the mechanical vibration frequency of mechanical beams 84. As such, after the modulated optical signal propagates from distal end 86 of the DETF structure 82 to the proximal end of the DETF structure 82, and back to distal end 86, the modulated optical signal may include information indicative of the mechanical vibration frequency of mechanical beams 84. A circuit, such as circuit 14 of FIGS. 1, 2, and 4, may determine an acceleration value based on the modulated optical signal which propagates through DETF structure 82.

Anchor structure 90 includes a first portion 92A, a second portion, 92B, and a third portion 92C. First portion 92A may be fixed to frame 80 at a first end and fixed to connecting structures 94 at a second end. In this way, first portion 92A connects frame 80 to connecting structures 94. Second portion 92B may be fixed to frame 80 at a first end and fixed to connecting structures 92 at a second end. In this way, second portion 92B, like first portion 92A, connects frame 80 to connecting structures 94. Third portion 92C includes connecting structures 94. Each connecting structure of connecting structures 94 may be fixed to DETF structure 82 such that each connecting structure of connecting structures 94 is perpendicular to DETF structure 82. Additionally, each connecting structure of connecting structures 94 is parallel to the other connecting structures of connecting structures 94. In this way, connecting structures 94 and DETF structure 82 form a lattice, with a space between each pair of consecutive connecting structures 94. In some examples, connecting structures 94 may be spaced substantially equally apart from each other along proof mass displacement axis 72 such that the respective spaces between each pair of consecutive connecting structures 94 are substantially equal in width.

In some examples, a width of each connecting structure of connecting structures 94 is within a range from 0.1 micrometers (μm) to 10 μm. In some examples, a width of each connecting structure of connecting structures 94 is 1.5 μm. In some examples, a width of each space between adjacent connecting structures of connecting structures 94 is within a range from 0.1 μm to 10 μm. For example, a width of the space between connecting structure 94A and connecting structure 94 may be within a range from 0.1 μm to 10 μm. In some examples, a width of first portion 92A and a width of second portion 92B is within a range from 1 μm to 100 μm. In some cases, the width of first portion 92A and the width of second portion 92B is a maximum width of anchor structure 90. In some examples, a width of each connecting structure of connecting structures 94 is substantially the same as respective widths of the other connecting structure of connecting structures 94. Additionally, in some examples, at least one connecting structure of connecting structures 94 is different from at least one other connecting structure of connecting structures 94. In some examples, a width of each space between adjacent connecting structures of connecting structures 94 is substantially the same as the respective widths of the other spaces between adjacent connecting structures of connecting structures 94. Additionally, in some examples, at least one gap between adjacent connecting structures of connecting structures 94 is different than at least one other gap between adjacent connecting structures of connecting structures 94.

In some examples, it may be desirable for accelerometer system 10 to achieve a high level of sensitivity in order to improve a quality of acceleration values measured by accelerometer system 10. In some cases, a mechanical quality factor associated with DETF structure 82 and a single-pass optical transmission efficiency associated with the junction of DETF structure 82 and anchor structure 90 may impact the sensitivity of accelerometer system 10. If the mechanical quality factor of DETF structure 82 is relatively high, an amount of damping which occurs during the mechanical vibration of mechanical beams 84 may be lower than an amount of damping which occurs during the mechanical vibration of mechanical beams 84 where the mechanical quality factor of DETF structure 82 is relatively low. A lower amount of damping may correspond to a higher sensitivity of accelerometer system 10. As such, a relatively high mechanical quality factor of DETF structure 82 may correspond to a relatively high sensitivity of accelerometer system 10. Additionally, if the single-pass optical transmission efficiency associated with the junction of DETF structure 82 and anchor structure 90 increases, a greater amount of the modulated optical signal which propagates through DETF structure 82 may be preserved, thus increasing the sensitivity of accelerometer system 10.

Consequently, it may be beneficial for the mechanical quality factor of DETF structure 82 and the single-pass optical transmission efficiency associated with the junction of DETF structure 82 and anchor structure 90 to be maintained at relatively high values. In some examples, a mechanical quality factor associated with DETF structure 82 and anchor structure 90 is within a range from 5,000 to 2,000,000. Additionally, in some examples, a single-pass optical transmission efficiency associated with the junction of DETF structure 82 and anchor structure 90 is greater than or equal to 85%. In some examples, a single-pass optical transmission efficiency associated with the junction of DETF structure 82 and anchor structure 90 is 90% when a frequency of the modulated optical signal propagating through DETF structure 82 is 1550 nanometers (nm)

The mechanical quality factor of DETF structure 82 and the single-pass optical transmission efficiency associated with the junction of DETF structure 82 and anchor structure 90 may, in some cases, be influenced by one or more parameters associated with the junction of DETF structure 82 and anchor structure 90. For example, a relatively high thickness of anchor structure 90 at the junction may correspond to a relatively high mechanical quality factor of DETF structure 82 and a relatively low thickness of anchor structure 90 at the junction may correspond to a relatively low mechanical quality factor of DETF structure 82. Additionally, a relatively high thickness of anchor structure 90 at the junction may correspond to a relatively low single-pass optical transmission efficiency associated with the junction and a relatively low thickness of anchor structure 90 at the junction may correspond to a relatively high single-pass optical transmission efficiency associated with the junction. In this manner, by simply adjusting the thickness of anchor structure 90 at the junction, one desirable parameter for high sensitivity of accelerometer system 10 may be sacrificed in favor of another desirable parameter. By placing connecting structures 94 to induce multi-mode interference, the junction may be arranged in order to maintain a relatively high mechanical quality factor of DETF structure 82 and a relatively high single-pass optical transmission efficiency associated with the junction.

Multi-mode interference is an optical effect which occurs as the modulated optical signal crosses the junction of DETF structure 82 and anchor structure 90. The modulated optical signal propagating through DETF structure 82 may include a set of optical modes having one or more optical modes. An increase in width of DETF structure 82 at optical interference zone 87 may cause the modulated optical signal propagating through DETF structure 82 to form an interference pattern. For example, as the modulated optical signal propagates through DETF structure 82 from distal end 86 to mechanical beams 84, an abrupt increase in the width of DETF structure 82 (e.g., the increase in width from W1 to W2) occurring at the distal end 88 of optical interference zone 87 may excite one or more higher-order optical modes of the set of optical modes, causing the one or more higher-order optical modes to interfere with a fundamental optical mode of the set of optical modes. Such an interference of the one or more higher-order optical modes and the fundamental optical mode may cause the interference pattern to form at optical interference zone 87. For example, coherent interaction may occur between the one or more higher-order optical modes and the fundamental optical mode, thus causing the formation of the interference pattern. In this way, the set of optical modes passing through optical interference zone 87 may include two or more optical modes. Additionally, as the modulated optical signal continues to propagate through the optical interference zone 87 to mechanical beams 84, the width of DETF structure 82 may decrease from W2 to W1 at the proximal end 89 of optical interference zone 87. Such a decrease in the width of DETF structure 82 may inhibit the one or more higher-order optical modes from propagating past the proximal end 89 of optical interference zone 87 to mechanical beams 84 while allowing the fundamental optical mode to propagate past the proximal end 89 of optical interference zone 87 to mechanical beams 84. In this way, the modulated optical signal may efficiently and properly induce mechanical vibration in mechanical beams 84 after passing through optical interference zone 87.

The interference pattern may include regions of relatively high optical intensity and regions of relatively low optical intensity. The regions of relatively low optical intensity may be located in areas where connecting structures 94 intersect with DETF structure 92. Additionally, the regions of relatively high optical intensity may be located in areas corresponding to spaces between adjacent connecting structures of connecting structures 94. In this way, the interference pattern may include alternating high-intensity and low-intensity regions. Connecting structures 94, in some examples, may be strategically placed such that the regions of relatively high optical intensity are located in areas corresponding to spaces between adjacent connecting structures of connecting structures 94 and the regions of relatively low optical intensity are located in areas corresponding to connecting structures 94. The interference pattern may enable the modulated optical signal to pass through the junction at a relatively high single-pass optical transmission efficiency (e.g., greater than or equal to 85%).

Since connecting structures 94 include five connecting structures, a stress distribution of the junction may be conducive to a high mechanical quality factor of DETF structure 82. Additionally, connecting structures 94 may prevent local stresses at the junction of DETF structure 82 and anchor structure 90 from exceeding a material strength of DETF structure 82 and/or anchor structure 90 (e.g., prevent DETF structure 82 and anchor structure 90 from fracturing). In this way, as illustrated in FIG. 5, DETF structure 82 has a relatively high mechanical quality factor and a single-pass optical transmission efficiency associated with the junction of DETF structure 82 and anchor structure 90 is relatively high. As such, in the example of FIG. 5A, the sensitivity of accelerometer system 10 is relatively high.

FIG. 5B is a conceptual diagram of a distal portion of a DETF structure 102 and another example anchor structure 110 enclosed in a frame 100, in accordance with one or more techniques of this disclosure. In some examples, frame 100 is an example of frame 52 of FIGS. 3-4. In some examples, DETF structure 102 is an example of first DETF structure 54 of FIGS. 3-4 and anchor structure 110 is an example of first anchor structure 64 of FIGS. 3-4. Additionally, in some examples, DETF structure 102 is an example of second DETF structure 58 and anchor structure 110 is an example of second anchor structure 68 of FIGS. 3-4. As illustrated in FIG. 5B, DETF structure 102 includes first mechanical beam 104A and second mechanical beam 104B, and optical interference zone 107. Additionally, as illustrated in FIG. 5B, anchor structure 110 includes a first portion 112A, a second portion 112B, and a third portion 112C. Third portion 112C may include connecting structures 114A-114N (collectively, "connecting structures 114"). In some examples, DETF structure 102 may be substantially the same as DETF structure 82 of FIG. 5A. In some examples, anchor structure 110 may be substantially the same as anchor structure 90, except third portion 112C of anchor structure 110 includes N connecting structures 114. N may be greater than or equal to two.

Figure 6:
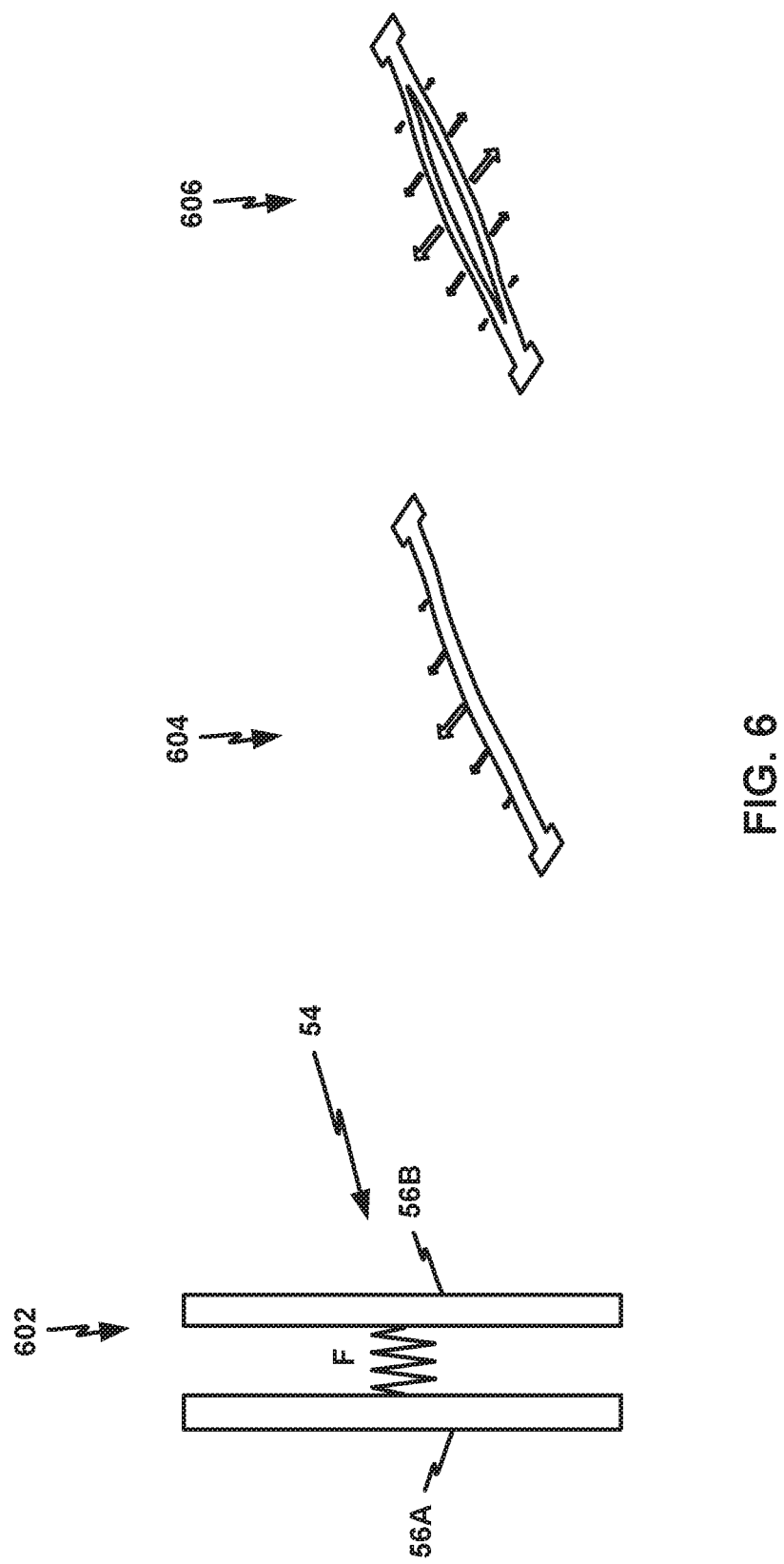
FIG. 6 illustrates additional aspects of the accelerometer system of FIG. 1, in accordance with one or more techniques of this disclosure.

FIG. 6 illustrates additional aspects of accelerometer system 10, in accordance with one or more techniques of this disclosure. For example, FIG. 6 illustrates the first DETF structure 54 including the first pair of mechanical beams 56. The optical signal emitted by light-emitting device 12 may induce a force between the first pair of mechanical beams 56, and the force may be modelled by a spring force. FIG. 6 illustrates a spring force provided by laser light between beams in an optical zipper in the gap between photonic crystal mechanical beams 56A, 56B of DETF structure 54 (602); a perspective view depiction of vibration modes in beams in an optical zipper in one common direction together (604); and a perspective view depiction of vibration modes in beams in an optical zipper in opposing directions of oscillation (606).

Figure 7:
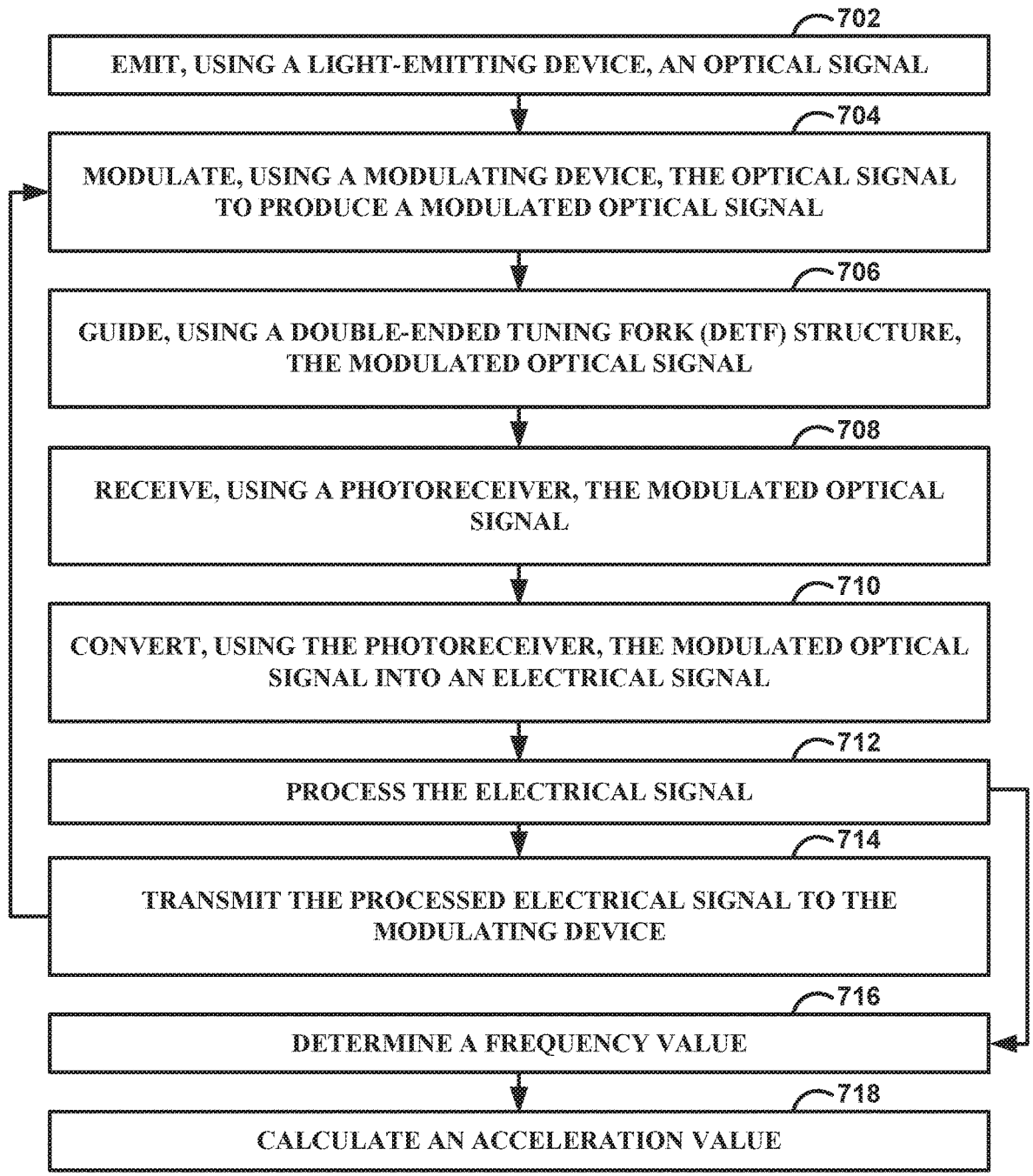
FIG. 7 is a flow diagram illustrating an example operation for determining a frequency value based on a mechanical vibrating frequency of a DETF structure secured within a frame by an anchor structure, in accordance with one or more techniques of this disclosure.

FIG. 7 is a flow diagram illustrating an example operation for determining a frequency value based on a mechanical vibrating frequency of a DETF structure secured within a frame by an anchor structure, in accordance with one or more techniques of this disclosure. For convenience, FIG. 7 is described with respect to light-emitting device 12, circuit 14, and proof mass assembly 16 of FIGS. 1-4. However, the techniques of FIG. 7 may be performed by different components of light-emitting device 12, circuit 14, and proof mass assembly 16 or by additional or alternative devices.

Accelerometer system 10, which includes light-emitting device 12, circuit 14, and proof mass assembly 16 is configured to, in some examples, measure an acceleration of an object in real-time or near real-time. In order to measure the acceleration, accelerometer system 10 is configured to measure a mechanical vibrating frequency of a DETF structure, the mechanical vibrating frequency being induced by an optical signal. An inertial navigation system may, in some examples, include accelerometer system 10. Based on the measured acceleration of an object over a period of time, the inertial navigation system may determine a position of the object over the period of time by performing a double integral of the acceleration over the period of time. In order to simplify the acceleration measurement, accelerometer system 10 may implement a positive feedback loop, as described with respect to the example operation of FIG. 7.

As illustrated in FIG. 7, light-emitting device 12 emits an optical signal (702). Light-emitting device 12 may, in some cases, include a laser device configured to emit photons. In some examples, light-emitting device 12 emits the photons at an optical power within a range between 0.1 microwatts (μW) and 10 μW. Light-emitting device 12 may transmit the optical signal to a modulating device of circuit 14, which modulates the optical signal (704). In some examples, the modulating device includes an electro-optic modulator, such as EOM 22A. In such examples, to modulate the optical signal, EOM 22A may increase an attenuation of the optical signal and decrease an attenuation of the optical signal for periods of time determined based on an electrical signal received by EOM 22A. After modulating the optical signal, the modulating device may, in some cases, transmit the modulated optical signal to proof mass assembly 16.

Mechanical beams 56 of first DETF structure 54 guide the modulated optical signal (706). For example, the modulated optical signal may propagate through first DETF structure 54 of proof mass assembly 16, inducing a mechanical vibration in mechanical beams 56. In some examples, the induced mechanical vibration frequency affects properties of the modulated optical signal. For example, a mechanical vibration frequency of first DETF structure 54 may be reflected in the modulated optical signal after the modulated optical signal propagates through first DETF structure 54. Anchor structure 64 may secure first DETF structure 54 to frame 52 such that first DETF structure 54 and anchor structure 64 form a cross shape, where first DETF structure 54 and anchor structure 64 intersect at a junction. As the modulated optical signal passes through an optical interference zone of first DETF structure 54, an interference pattern may form at the optical interference zone. The optical interference zone, in some cases, may be located at the junction of first DETF structure 54 and anchor structure 64. The interference pattern ensures that the modulated optical signal may pass through the optical interference zone with a relatively high efficiency and anchor structure 64 ensures that a mechanical quality factor of DETF structure 64 is relatively high.

A photoreceiver (e.g., photoreceiver 24A) receives the modulated optical signal (708) after the modulated optical signal travels through first DETF structure 54. Additionally, photoreceiver 24A converts the modulated optical signal into an electrical signal (710). Photoreceiver 24A may be a semiconductor device configured to receive photons and convert the photons into electrical energy. When photoreceiver 24A generates the electrical signal, photoreceiver 24A may preserve properties of the optical signal, such as frequencies or intensity levels. For example, the mechanical vibration frequency of first DETF structure 54, which is reflected in the modulated optical signal, may also be reflected in the electrical signal generated by photoreceiver 24A. Additionally, in some examples, an intensity of the modulated optical signal may be reflected in the electrical signal. For example, a greater intensity level of the modulated optical signal may correspond to a greater current amplitude of the electrical signal, and a lower intensity level of the modulated optical signal may correspond to a lower current amplitude of the electrical signal.

Circuit 14 processes the electrical signal (712) using feedback unit 26A. In some examples, to process the electrical signal, feedback unit 26A uses band pass filter 40A, phase shifter 42A, electronic amplifier 44A, and voltage limiter 46A. Feedback unit 26A transmits the processed electrical signal to the modulating device (714), and the operation returns to block 704. As such, the modulating device modulates the optical signal generated by light-emitting device 12 using the processed electrical signal, which is influenced by the mechanical vibrating frequency of first DETF structure 54. This modulation completes a positive feedback loop, in that the modulated optical signal is created by the modulating device based on the processed electrical signal, which in turn is created by circuit 14 based on the modulated optical circuit. Additionally, the mechanical vibration of the first DETF structure 54, which is induced by the modulated optical signal may be influenced by the mechanical vibration frequency of the first DETF structure 54 itself, since the mechanical vibration frequency may drive the electrical signal, which in turn drives the modulated optical signal.

Frequency counter 28A determines a frequency value based on the processed electrical signal (716). In some examples, the frequency value may represent the mechanical vibration frequency of the first DETF structure 54. Based on the frequency value, processing circuitry 30 is configured to calculate an acceleration value (718). In some examples, processing circuitry 30 may calculate the acceleration value by subtracting a baseline frequency value from the frequency value to obtain a frequency difference value, where the baseline frequency value represents a mechanical vibration frequency of the first DETF structure 54 while proof mass 50 is not displaced (i.e., while acceleration is equal to 0 m/s$^2$). The frequency difference value may, in some examples, be correlated with acceleration. Based on the correlation, processing circuitry 30 may calculate the acceleration value using the frequency difference value. In some examples, processing circuitry 30 is configured to track the acceleration value over a period of time as the displacement of proof mass 50 changes. Processing circuitry 30 may, in some cases, store the acceleration values over the period of time in a memory.

Although the example operation of FIG. 7 is described with respect to the first positive feedback loop including, among other things, EOM 22A, photoreceiver 24A, feedback unit 26A, frequency counter 28A, and first DETF structure 54, in some examples, the example operation of FIG. 7 may be performed using the second positive feedback loop including, among other things, EOM 22B, photoreceiver 24B, feedback unit 26B, frequency counter 28B, and second DETF structure 58.

Figure 8:
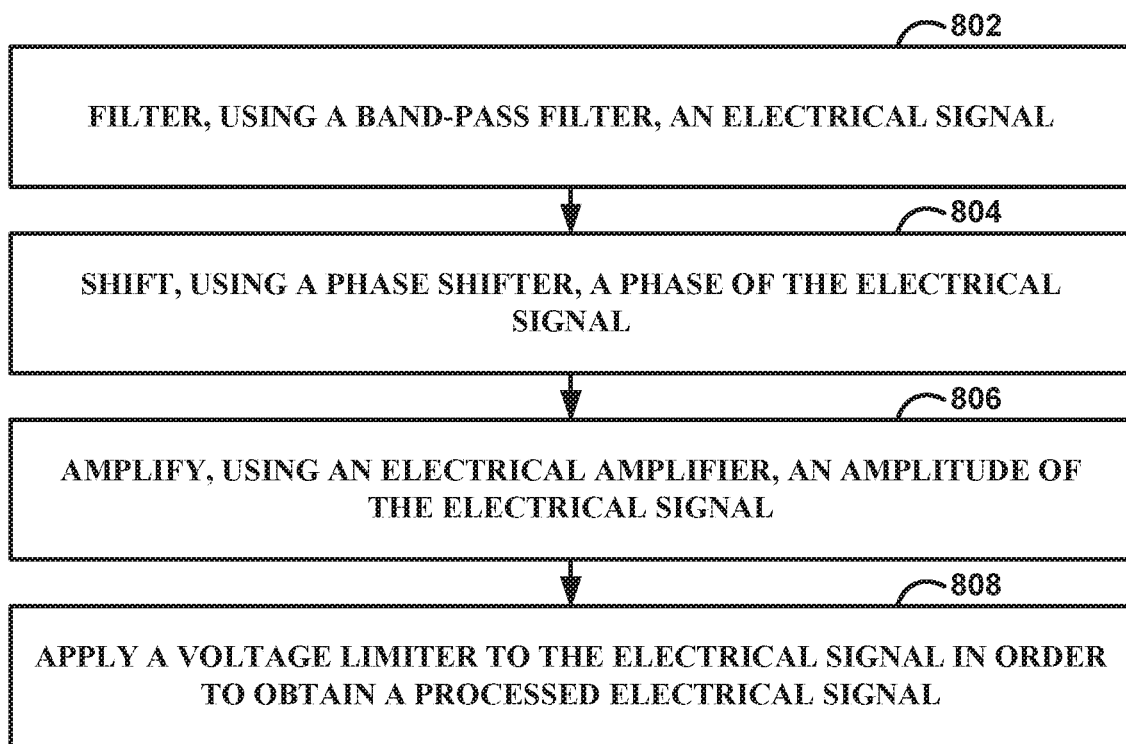
FIG. 8 is a flow diagram illustrating an example operation for processing an electrical signal, in accordance with one or more techniques of this disclosure.

FIG. 8 is a flow diagram illustrating an example operation for processing an electrical signal, in accordance with one or more techniques of this disclosure. For convenience, FIG. 8 is described with respect to light-emitting device 12, circuit 14, and proof mass assembly 16 of FIGS. 1-4. However, the techniques of FIG. 8 may be performed by different components of light-emitting device 12, circuit 14, and proof mass assembly 16 or by additional or alternative devices.

The example operation of FIG. 8 may represent an example operation to process the electrical signal (block 714 of FIG. 6). Band pass filter 40A filters the electrical signal (802) generated by 24A. Band pass filter 40A may be an electronic filter that attenuates frequencies outside of a frequency range and "passes" frequencies within the frequency range. Phase shifter 42A shifts a phase of the electrical signal (804). In some examples, phase shifter 42A may "delay" the electrical signal by a time value in order to shift a timeline in which frequency components of the electrical signal oscillate. Electronic Amplifier 44A amplifies an amplitude of the electrical signal (806). In other words, electronic amplifier 44A may increase a power of the electrical signal. Voltage limiter 46A limits the voltage of the electrical signal to obtain the processed electrical signal (808). In other words, voltage limiter 46A may prevent the electrical signal from exceeding the maximum voltage value, meaning that the processed electrical signal produced by feedback unit 26A may not exceed the maximum voltage value.

Although the example operation of FIG. 8 is described with respect to the first positive feedback loop including, among other things, band pass filter 40A, phase shifter 42A, electronic amplifier 44A, and voltage limiter 46A, in some examples, the example operation of FIG. 8 may be performed using the second positive feedback loop including, among other things, band pass filter 40B, phase shifter 42B, electronic amplifier 44B, and voltage limiter 46B.

Figure 9:
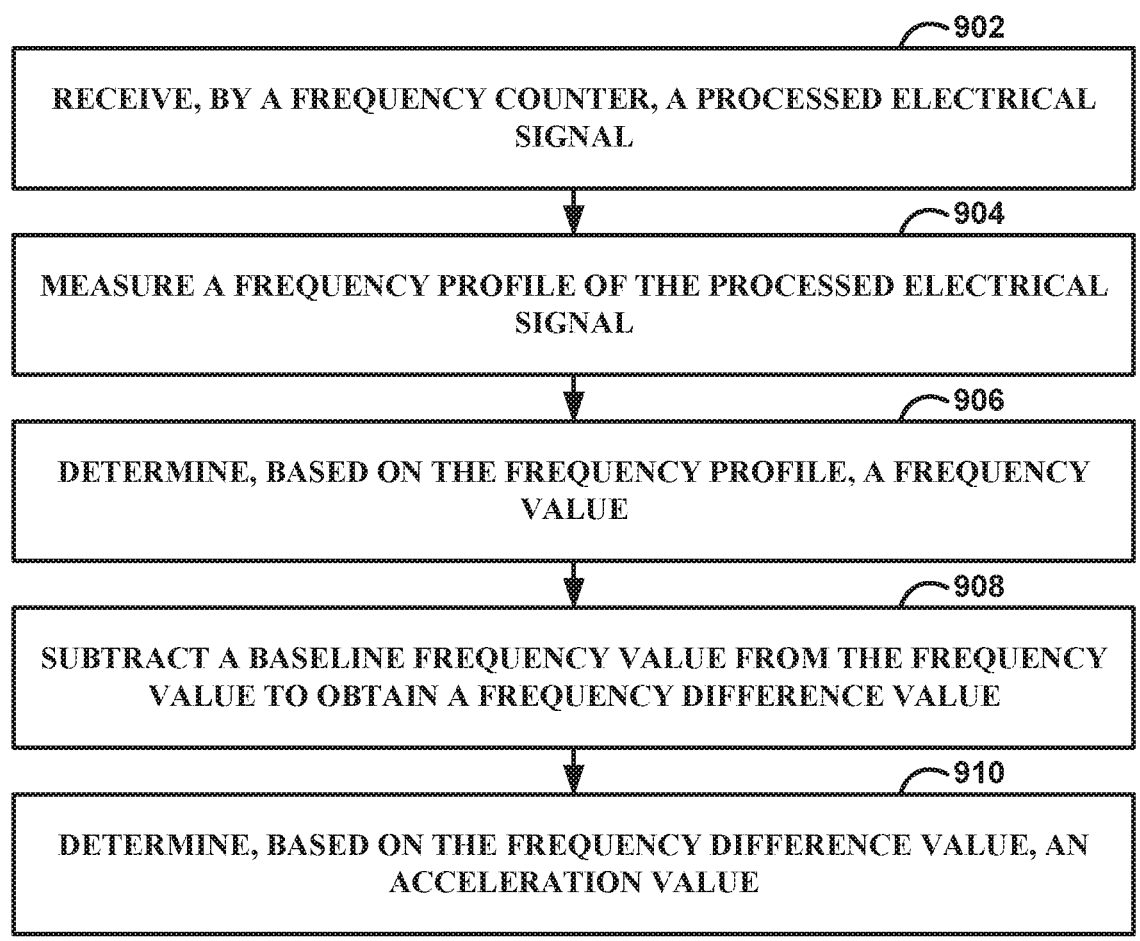
FIG. 9 is a flow diagram illustrating an example operation for calculating an acceleration value based on a frequency value measured by accelerometer system 10, in accordance with one or more techniques of this disclosure.

FIG. 9 is a flow diagram illustrating an example operation for calculating an acceleration value based on a frequency value measured by accelerometer system 10, in accordance with one or more techniques of this disclosure. For convenience, FIG. 9 is described with respect to light-emitting device 12, circuit 14, and proof mass assembly 16 of FIGS. 1-4. However, the techniques of FIG. 9 may be performed by different components of light-emitting device 12, circuit 14, and proof mass assembly 16 or by additional or alternative devices.

Frequency counter 28A receives a processed electrical signal (902). In some examples, the processed electrical signal may be processed, at least in part, by feedback unit 26A. After receiving the processed electrical signal, frequency counter 28A measures a frequency profile of the processed electrical signal (904) and determines, based on the frequency profile, a frequency value (906). In this way, frequency counter 28A may be configured to isolate the frequency value from the processed electrical signal, where the frequency value represents a mechanical vibrating frequency of first DETF structure 54. As the mechanical vibrating frequency of first DETF structure 54 changes, the frequency value may change commensurately, thus enabling accelerometer system 10 to identify changes in the mechanical vibrating frequency of first DETF structure 54 based on the processed electrical signal.

Processing circuitry 30 subtracts a baseline frequency value form the frequency value to obtain a frequency difference value (908). In some examples, the baseline frequency value represents a mechanical vibrating frequency of first DETF structure 54 when first DETF structure 54 is excited by an optical signal and proof mass 50 is not displaced along the proof mass displacement axis 72. When proof mass 50 is not displaced along the proof mass displacement axis 72, an acceleration of accelerometer system 10 may be zero. As such, the baseline frequency value may represent a mechanical vibration frequency of the first DETF structure 54 at zero acceleration. In some examples, the baseline frequency value may be within a range between 1 Megahertz (MHz) and 2 MHz. In some examples, the baseline frequency value is 1.33 MHz. Processing circuitry 30 determines, based on the frequency difference value, an acceleration value (910). Acceleration may, in some cases, have a linear relationship with the frequency difference value. In other words, a change in the frequency difference value may correspond to a commensurate change in acceleration.

Although the example operation of FIG. 9 is described with respect to the first positive feedback loop including, among other things, feedback unit 26A and frequency counter 28A, in some examples, the example operation of FIG. 9 may be performed using the second positive feedback loop including, among other things, feedback unit 26B and frequency counter 28B.

In one or more examples, the accelerometers described herein may utilize hardware, software, firmware, or any combination thereof for achieving the functions described. Those functions implemented in software may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure.

Instructions may be executed by one or more processors within the accelerometer or communicatively coupled to the accelerometer. The one or more processors may, for example, include one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses that include integrated circuits (ICs) or sets of ICs (e.g., chip sets). Various components, modules, or units are described in this disclosure to emphasize functional aspects of devices configured to perform the disclosed techniques, but do not necessarily require realization by different hardware units. Rather, various units may be combined or provided by a collection of interoperative hardware units, including one or more processors as described above, in conjunction with suitable software and/or firmware.

What is claimed is:

1. A system comprising:
   a light-emitting device configured to emit an optical signal;
   a circuit comprising a modulating device configured to modulate the optical signal to produce a modulated optical signal; and
   a mechanical assembly comprising:
      an anchor structure comprising:
         a first portion;
         a second portion; and
         a third portion comprising a set of connecting structures configured to pass the modulated optical signal, each connecting structure of the set of connecting structures connecting the first portion and the second portion, wherein the set of connecting structures comprises two or more connecting structures, and wherein a width of each connecting structure of the set of connecting structures is less than a maximum width of the anchor structure; and
      a mechanical structure intersecting with the anchor structure, the mechanical structure configured to guide the modulated optical signal,
      wherein each connecting structure of the set of connecting structures is perpendicular to the mechanical structure, and
      wherein the set of connecting structures is connected to the mechanical structure.

2. The system of claim 1, wherein the mechanical assembly further comprises:
   a proof mass, wherein a proximal end of the mechanical structure is fixed to the proof mass; and
   a frame, wherein a distal portion of the mechanical structure is secured to the frame by the anchor structure, and
   wherein the circuit is further configured to determine an acceleration value based on the modulated optical signal.

3. The system of claim 1, wherein a mechanical quality factor associated with the mechanical structure and the anchor structure is within a range from 5,000 to 2,000,000.

4. The system of claim 1, wherein a single-pass optical transmission efficiency associated with the set of connecting structures greater than or equal to 85%.

5. The system of claim 1, wherein the set of connecting structures comprises five connecting structures.

6. The system of claim 1, wherein the width of each connecting structure of the set of connecting structures is within a range from 0.1 micrometers (µm) to 10 µm.

7. The system of claim 2, wherein the modulating device is a first modulating device, the modulated optical signal is a first modulated optical signal, the mechanical structure is a first mechanical structure, the anchor structure is a first anchor structure, the set of connecting structures is a first set of connecting structures, and the acceleration value is a first acceleration value, wherein the circuit further comprises:
 a second modulating device configured to modulate the optical signal to produce a second modulated optical signal, wherein the mechanical assembly further comprises:
 a second anchor structure comprising a second set of connecting structures configured to pass the second modulated optical signal, wherein the second set of connecting structures comprises two or more connecting structures, and wherein a width of each connecting structure of the second set of connecting structures is less than a maximum width of the second anchor structure; and
 a second mechanical structure intersecting with the second anchor structure, the second mechanical structure configured to guide the second modulated optical signal, wherein a proximal end of the second mechanical structure is fixed to the proof mass and a distal portion of the second mechanical structure is secured to the frame by the second anchor structure, and wherein the circuit is further configured to:
 determine a second acceleration value based on the second modulated optical signal.

8. The system of claim 7, wherein the second anchor structure comprises:
 a fourth portion connected to the frame;
 a fifth portion connected to the frame; and
 a sixth portion between the fourth portion and the fifth portion, wherein the sixth portion comprises the second set of connecting structures, each connecting structure of the second set of connecting structures connecting the fourth portion and the fifth portion, wherein each connecting structure of the second set of connecting structures is perpendicular to the mechanical structure, and wherein the second set of connecting structures is connected to the second mechanical structure, enabling the second modulated optical signal to propagate through the second set of connecting structures via the second mechanical structure.

9. The system of claim 7, wherein to determine the first acceleration value based on the first modulated optical signal, the circuit is further configured to:
 receive, using a first photoreceiver, the first modulated optical signal;
 convert, using the first photoreceiver, the first modulated optical signal into a first electrical signal;
 process the first electrical signal to obtain a first processed electrical signal;
 transmit the first processed electrical signal to the first modulating device, wherein the first modulating device is configured to modulate the optical signal based on the first processed electrical signal; and
 determine, based on the first processed electrical signal, the first acceleration value,
 wherein to determine the second acceleration value based on the second modulated optical signal, the circuit is further configured to:
 receive, using a second photoreceiver, the second modulated optical signal;
 convert, using the second photoreceiver, the second modulated optical signal into a second electrical signal;
 process the second electrical signal to obtain a second processed electrical signal;
 transmit the second processed electrical signal to the second modulating device, wherein the second modulating device is configured to modulate the optical signal based on the second processed electrical signal; and
 determine, based on the second processed electrical signal, the second acceleration value, and wherein the circuit is further configured to:
 determine, based on the first acceleration value and the second acceleration value, a third acceleration value indicative of a present acceleration of the system.

10. The system of claim 9, wherein the proof mass is configured to:
 displace, relative to the frame and along a proof mass displacement axis, by a displacement value, causing a length of the first mechanical structure to decrease and causing a length of the second mechanical structure to increase,
 wherein the displacement of the proof mass causes a mechanical vibration frequency of the first mechanical structure to decrease from a baseline frequency value to a first frequency value, and
 wherein the displacement of the proof mass causes a mechanical vibration frequency of the second mechanical structure to increase from the baseline frequency value to a second frequency value.

11. The system of claim 10, wherein to determine the first acceleration value based on the first processed electrical signal, processing circuitry of the circuit is configured to:
 subtract the baseline frequency value from the first frequency value to obtain a first frequency difference value;
 determine, based on the first frequency difference value, the first acceleration value, and wherein to determine the second acceleration value, the processing circuitry is configured to:
 subtract the baseline frequency value from the second frequency value to obtain a second frequency difference value; and
 determine, based on the second frequency difference value, the second acceleration value.

12. A mechanical assembly comprising:
 an anchor structure comprising:
 a first portion;
 a second portion; and
 a third portion comprising a set of connecting structures configured to pass a modulated optical signal, each connecting structure of the set of connecting structures connecting the first portion and the second portion, wherein the set of connecting structures comprises two or more connecting structures, and wherein a width of each connecting structure of the set of connecting structures is less than a maximum width of the anchor structure; and a mechanical structure intersecting with the anchor structure, the mechanical structure configured to guide the modulated optical signal, wherein each connecting structure of the set of connecting structures is perpendicular to the mechanical structure, and wherein the set of connecting structures is connected to the mechanical structure.

13. The mechanical assembly of claim 12, wherein a mechanical quality factor associated with the mechanical structure and the anchor structure is within a range from 5,000 to 2,000,000.

14. The mechanical assembly of claim 12, wherein a single-pass optical transmission efficiency associated with the first set of connecting structures greater than or equal to 85%.

15. The mechanical assembly of claim 12, wherein the set of connecting structures comprises five connecting structures.

16. The mechanical assembly of claim 12, wherein the width of each connecting structure of the set of connecting structures is within a range from 0.1 micrometers (μm) to 10 μm.

17. The mechanical assembly of claim 12, wherein the modulated optical signal is a first modulated optical signal, the mechanical structure is a first mechanical structure, the anchor structure is a first anchor structure, and the set of connecting structures is a first set of connecting structures, wherein the mechanical assembly further comprises:

a second anchor structure comprising a second set of connecting structures configured to pass a second modulated optical signal, wherein the second set of connecting structures comprises two or more connecting structures, and wherein a width of each connecting structure of the second set of connecting structures is less than a maximum width of the second anchor structure; and a second mechanical structure intersecting with the second anchor structure, the second mechanical structure configured to guide the second modulated optical signal.

18. A method comprising:

emitting, using a light-emitting device, an optical signal;

modulating, using a modulating device of a circuit, the optical signal to produce a modulated optical signal;

passing, by a set of connecting structures of an anchor structure, the modulated optical signal, each connecting structure of the set of connecting structures connecting a first portion and a second portion of the anchor structure, wherein a third portion of the anchor structure comprises the set of connecting structures, wherein the set of connecting structures comprises two or more connecting structures, and wherein a width of each connecting structure of the set of connecting structures is less than a maximum width of the anchor structure; and guiding, by a mechanical structure intersecting with the anchor structure, the modulated optical signal, wherein each connecting structure of the set of connecting structures is perpendicular to the mechanical structure, and wherein the set of connecting structures is connected to the mechanical structure.

* * * * *